United States Patent
Fujita et al.

(10) Patent No.: US 6,905,211 B2
(45) Date of Patent: Jun. 14, 2005

(54) COLOR SEPARATION DEVICE, IMAGING OPTICAL ENGINE, AND PROJECTION APPARATUS

(75) Inventors: Kazuhiro Fujita, Tokyo (JP); Satoshi Yamauchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/328,006

(22) Filed: Dec. 26, 2002

(65) Prior Publication Data

US 2003/0147051 A1 Aug. 7, 2003

(30) Foreign Application Priority Data

Dec. 28, 2001 (JP) ........................................ 2001-401496
Feb. 28, 2002 (JP) ........................................ 2002-053661

(51) Int. Cl.$^7$ ...................... G03B 21/14; G03B 21/28; G02B 5/30
(52) U.S. Cl. .............................. 353/20; 353/81; 353/33; 359/490; 359/496; 359/495
(58) Field of Search ............................. 353/7, 8, 20, 30, 353/31, 33, 81, 84, 34; 348/762, 757; 349/8–10, 15, 57, 18; 359/464, 465, 490, 494–497, 501, 502, 483

(56) References Cited

U.S. PATENT DOCUMENTS

| | | | |
|---|---|---|---|
| 4,050,165 A | 9/1977 | Yamauchi et al. | |
| 4,112,470 A | 9/1978 | Yamauchi | |
| 4,214,257 A | 7/1980 | Yamauchi | |
| 4,365,209 A | 12/1982 | Yamauchi | |
| 4,935,911 A | 6/1990 | Ohuchida et al. | |
| 5,060,212 A | 10/1991 | Fujita et al. | |
| 5,097,462 A | 3/1992 | Fujita et al. | |
| 5,107,477 A | 4/1992 | Fujita et al. | |
| 5,604,606 A | 2/1997 | Miyashita et al. | |
| 5,646,840 A | 7/1997 | Yamauchi et al. | |
| 5,652,896 A | 7/1997 | Yamauchi et al. | |
| 5,675,815 A | 10/1997 | Yamauchi et al. | |
| 5,701,497 A | 12/1997 | Yamauchi et al. | |
| 5,751,384 A | 5/1998 | Sharp | |
| 5,815,221 A | * 9/1998 | Kojima et al. | ............... 348/751 |
| 5,845,143 A | 12/1998 | Yamauchi et al. | |
| 5,907,438 A | 5/1999 | Fujita et al. | |
| 6,090,344 A | 7/2000 | Yamauchi et al. | |
| 6,176,586 B1 | * 1/2001 | Hirose et al. | ................. 353/31 |
| 6,177,667 B1 | 1/2001 | Fujita et al. | |

(Continued)

FOREIGN PATENT DOCUMENTS

| | | |
|---|---|---|
| JP | 11-504441 | 4/1999 |
| JP | 2000-284228 | 10/2000 |
| JP | 2001-281614 | 10/2001 |
| WO | WO 96/37806 | 11/1996 |

*Primary Examiner*—Judy Nguyen
*Assistant Examiner*—Andrew Sever
(74) *Attorney, Agent, or Firm*—Oblon, Spivak, McClelland, Maier & Neustadt, P.C.

(57) ABSTRACT

A color separation device according to the present invention comprises a first color separation member having a first polarization direction changing element and a second polarization direction changing element, and a first polarization separation element, and a second color separation member having a second polarization separation element. The first color separation member may be configured from a color separation function element and a polarization direction changing element. Linearly polarized light being made incident on the first color separation member at an angle of approximately 45 degrees so as to separate the light into reflected light and transmitted light, both lights having different colors and one of the different colors corresponding to one of three colors, and one of the lights being made incident on the second color separation member so as to separate the one of the lights into further reflected light and further transmitted light, both further reflected light and further transmitted light corresponding to the other two of the three colors, respectively.

25 Claims, 17 Drawing Sheets

U.S. PATENT DOCUMENTS

| | | | |
|---|---|---|---|
| 6,181,473 B1 | 1/2001 | Fujita et al. | |
| 6,183,091 B1 * | 2/2001 | Johnson et al. | 353/20 |
| 6,273,567 B1 * | 8/2001 | Conner et al. | 353/20 |
| 6,282,458 B1 | 8/2001 | Murayama et al. | |
| 6,309,071 B1 * | 10/2001 | Huang et al. | 353/31 |
| 6,388,718 B1 * | 5/2002 | Yoo et al. | 349/9 |
| 6,419,362 B1 * | 7/2002 | Ikeda et al. | 353/20 |
| 6,490,087 B1 * | 12/2002 | Fulkerson et al. | 359/487 |
| 6,497,488 B1 | 12/2002 | Yamauchi et al. | |
| 6,530,663 B2 * | 3/2003 | Lin | 353/33 |
| 6,628,346 B1 * | 9/2003 | Ebiko | 349/9 |
| 6,698,896 B2 * | 3/2004 | Suzuki et al. | 353/33 |
| 6,781,640 B1 * | 8/2004 | Huang | 349/5 |

* cited by examiner

PRIOR ART

PRIOR ART

COLOR SEPARATION DEVICE, IMAGING OPTICAL ENGINE, AND PROJECTION APPARATUS

BACKGROUND OF THE INVENTION

1. Field of the Invention

The present invention generally relates to a color separation device that separates linearly polarized white light into three primary colors, an imaging optical engine that generates a color image (color image light) using such color separation device, and a projection apparatus using such imaging optical engine.

2. Description of the Related Art

Recently, "liquid crystal projectors" that project images displayed on liquid crystal panels, etc. onto display media such as a screen, etc. in a larger scale are widely used for displaying video reproduction images and computer data, etc. In particular, "three-panel liquid crystal projectors" used for a color image presentation are widely used since the color images can be displayed thereby with a high resolution.

The liquid crystal panels are generally referred to as "light valves" and they can change the polarization direction of output light with respect to linearly polarized input light on a pixel basis.

Meanwhile, "wavelength selective retarders" that can provide "a half-wavelength retardation" between ordinary light and extraordinary light in the linearly polarized light in a desired waveband are known. The half-wavelength retardation can be provided to "light in the waveband that can be arbitrarily determined as a design condition." Therefore, for example, when p-polarized light is made incident on the wavelength selective retarders, only certain waveband is s-polarized and the other wavebands are remained p-polarized.

Recently, three-panel liquid crystal projectors using such wavelength selective retarders have been proposed (see for example, Japanese Laid-Open Patent Application No. 2000-284228).

FIG. 1 shows a schematic configuration of one example of a projection apparatus mounted on a three-panel liquid crystal projector according to the related art. The projection apparatus includes a light source part 1 having a lamp 11 and a polarization plate 12, a color separation part 2 having a polarization beam splitter 21 for color separation, a narrowband phase difference plate (wavelength selective retarder) 22 for the red component, and a narrowband phase difference plate (wavelength selective retarder) 23 for the blue component, a GB (green/blue components) modification part 3 having a polarization beam splitter 31 for the green and blue components, a liquid crystal panel (reflective optical modulator) 32 for the blue component, and a liquid crystal panel (reflective optical modulator) 33 for the green component, a red component modification part 4 having a polarization beam splitter 41 for the red component and a liquid crystal panel (reflective optical modulator) 42 for the red component, a color combining part 5 having a polarization beam splitter 51 for color combining and a narrowband phase difference plate (wavelength selective retarder) 52 for the green component, and a projection optical system part 6.

In such a three-panel liquid crystal projector, the linearly polarized white light is incident on the first wavelength selective retarder (described as "narrowband phase difference plate" in the cited document) 22. Among the lights that passed through the first wavelength selective retarder 22, waveband light (A) having its polarization direction changed and waveband light (NA) not having its polarization direction changed are separated to have different optical paths respectively by the polarization beam splitter 21. The waveband light (A) having its polarization direction changed is applied to the first light valve (mentioned as "reflective light modulator" in the cited document) 42. The waveband light (NA) not having its polarization direction changed is further separated into waveband light (B) and waveband light (C), each of the waveband lights (B, C) having a different primary color, by the second wavelength selective retarder 23 and the polarization beam splitter 31. The waveband light (B) is applied to the second light valve 32 and the waveband light (C) is applied to the third light valve 33. After combining image lights (LB, LC) that are modulated according to image signals and which are reflected from the second light valve 32 and the third light valve 33 by the second polarization beam splitter 31, the polarization directions of the image lights (LB, LC) are made coincident with one another by the third waveband selective retarder 52. Whereas, image light reflected from the first light valve 42 (LA) is combined with the previously combined image lights LB, LC by the third polarization beam splitter 51. The combined color image light is incident on the projection optical system 6, which projects the combined color image light onto a screen (not shown) so as to display a color image.

As for the wavelength selective retarders used in such a projection apparatus, an element formed by stacking phase difference plates that make use of double reflection of light disclosed in Japanese patent No. 130537 (Japanese Laid-Open Application No. 11-504441) may be used.

In the projection apparatus disclosed in the Japanese Laid-Open Patent Application No. 2000-284228, image light formed by liquid crystal panels (light valves) for respective primary colors are directed to a projection lens by passing through polarization beam prisms or dichroic prisms, etc. In such a projection apparatus, the projection lens is designed so that the projection magnification, etc. with respect to each liquid crystal panel are precisely controlled in order to make the back focal distance from the projection lens to each liquid crystal panel equal. However, when imaging optical paths having wavelength selective retarders made from materials that are different from glass material of the prisms, in other words, made from material having refraction indices different from that of the prism, and imaging optical paths without those wavelength selective retarders are used together, color image quality is adversely affected. In addition, it is difficult to devise a design for the projection lens that keeps a high level of performance.

Further, as another example of the related art, a reflective liquid crystal projector device is proposed in Japanese Laid-Open Patent Application No. 2001-281614. The proposed projector device is characterized in that an optical engine part in a projection unit of the proposed projector device is integrally configured, as a color separation/combining part, from a first color separation part, an entry and exit directions change part, a second color separation part, a color combining part, and a support part and in that a polarization direction-rotating member (narrowband phase difference plate corresponding to the wavelength selective retarder) is stacked onto the color separation parts.

The projection unit of the proposed projector device is configured from, for example, as shown in FIG. 2, a light source part 301 having a lamp 311 and a polarization plate 312, a color separation part 302 having a polarization separation surface 321 for color separation, a narrowband phase difference plate 322 for red component, and a narrowband phase difference plate 323 for blue component, a GB (green/blue components) modulation part 303 having a polarization separation surface 331 for green component and blue component, a liquid crystal panel 332 for the green component, and a liquid crystal panel 333 for the blue component, and a R (red component) modulation part 304 having a polarization separation surface 341 for the red component and a liquid crystal panel 342 for the red component, a color combining part 305 having a polarization separation surface 351 for color combining and a narrowband phase difference plate 352 for the blue component, a positioning support 306, and a projection optical system 307.

However, in such projector device configured as shown in FIG. 2, at least three sets of polarization direction-rotating members (narrowband phase difference plates) 322, 323, 352 are necessary. Not only does it cause an increase in cost due to an increase in the number of components but it may also generate a risk of reducing the performance level of the projector device when, for example, assembly error accumulates during manufacture. Also, as shown in FIG. 2, image light from the liquid crystal panel 332 for the green component or the liquid crystal panel 333 for the blue component passes through the polarization direction-rotating member (narrowband phase difference plate for the blue component) 352 at an angle of 45 degrees. This means that the image light passes through the polarization direction-rotating member 352 in the form of a parallel plate diagonally and this leads to deviation in the optical path, etc. Further, since the image light formed by the liquid crystal panel 342 for the red component dose not pass through any of the polarization direction-rotating members, optical path length of the red image light and that of blue and green image light are different, and this leads to quality reduction in the composite color image.

SUMMARY OF THE INVENTION

Accordingly, it is a general object of the present invention to provide a color separation device, by which it is possible to perform color separation where the polarization directions are made coincident with one another by suitably combining a wavelength selective retarder and a polarization separation element or a color separation function element.

A further object of the present invention is to provide an imaging optical engine that has imaging optical path length for respective colors, which optical paths lie between respective light valves and a color combining part, coincide with one another by using such color separation device and thus eliminating the necessity of providing the wavelength selective retarder in the imaging optical path.

A further object of the present invention is to provide a projection apparatus using such an imaging optical engine, which projection apparatus can provide high quality color images.

A further object of the present invention is to provide an imaging optical engine and a projection apparatus, both having a high quality, by effectively improving the contrast of the color images.

A further object of the present invention is to provide an adjustable projection apparatus, which can adapt to a case when priority is given to the brightness over the contrast of the color image according to a user's intended purpose.

A further object of the present invention is to provide a projection apparatus, which has a configuration that prevents quality reduction of the combined color image by realizing an optical system that has no inclined wavelength selective retarders in optical paths for projecting the images formed at respective light valves.

According to the present invention, there is provided a color separation device of a first type that comprises a first color separation member having a first polarization direction changing element, a second polarization direction changing element, each of the polarization direction changing element changing polarization directions of different predetermined wavebands of incident light in different modes, and a first polarization separation element that reflects or transmits the incident light according to the polarization directions of the incident light, and a second color separation member having a second polarization separation element. Linearly polarized light being made incident on the first color separation member at an angle of approximately 45 degrees so as to separate the linearly polarized light into reflected light and transmitted light, both reflected light and transmitted light having different colors and one of the different colors corresponding to one of three colors, and one of the reflected light and the transmitted light being made incident on the second color separation member so as to separate one of the reflected light and the transmitted light into further reflected light and further transmitted light, both further reflected light and further transmitted light corresponding to the other two of the three colors, respectively.

In such a color separation device of the first type according to the present invention, the first polarization separation element may be supported between the first polarization direction changing element and the second polarization direction changing element.

In such a color separation device of the first type according to the present invention, the linearly polarized light may be made incident on and may pass through the first polarization direction changing element at an angle of approximately 45 degrees so as to separate the linearly polarized light into waveband light having its polarization direction changed and waveband light not having its polarization direction changed; the waveband light having its polarization direction changed by the first polarization direction changing element may be reflected from the first polarization separation element as the reflected light corresponding to one of the three colors; the waveband light not having its polarization direction changed by the first polarization direction changing element may pass through the first polarization separation element as the transmitted light; the reflected light may be separated from the transmitted light by passing through the first polarization direction changing element again; the transmitted light may pass through the second polarization direction changing element that is provided in parallel with the first polarization direction changing element so as to separate the transmitted light into waveband light having its polarization direction changed and waveband light not having its polarization direction changed; the waveband light having its polarization direction changed by the second polarization direction changing element may be reflected from the second polarization separation element as further reflected light corresponding to one of the other two of the three colors; and the waveband light not having its polarization direction changed by the second polarization direction changing element may pass through the second polarization separation element as further transmitted light corresponding to the other one of the other two of the three colors.

The color separation device of the first type according to the present invention may comprises a first combined optical element having the first polarization direction changing element adhesively provided on an inclined surface of a first optical prism and the first polarization separation element stacked on the first polarization direction changing element, and a second combined optical element having the second polarization separation element adhesively provided on one of two orthogonal inclined surfaces of a second optical prism and the second polarization direction changing element adhesively provided on the other one of the two orthogonal inclined surfaces of the second optical prism. The first combined optical element and the second combined optical element are optically integrated so that the first polarization separation element adheres to the second polarization direction changing element.

According to the present invention, there is provided a color separation device of a second type that comprises a first color separation member having a color separation function element that reflects or transmits incident light of a certain color and a polarization direction changing element that changes polarization directions of different predetermined wavebands of the incident light in different modes, and a second color separation member having a polarization separation element. Linearly polarized light being made incident on the first color separation member at an angle of approximately 45 degrees so as to separate the linearly polarized light into reflected light and transmitted light, both reflected light and transmitted light having different colors and one of the different colors corresponding to one of three colors, and one of the reflected light and the transmitted light being made incident on the second color separation member so as to separate one of the reflected light and the transmitted light into further reflected light and further transmitted light, both further reflected light and further transmitted light corresponding to the other two of the three colors, respectively.

In such a color separation device of the second type according to the present invention, the first color separation member may be provided in parallel with the polarization direction changing element.

In such a color separation device of the second type according to the present invention, the linearly polarized light may be made incident on the color separation function element at an angle of approximately 45 degrees so as to separate the linearly polarized light into reflected light and transmitted light, both reflected light and transmitted light having different colors and one of the different colors corresponding to one of the three colors; one of the reflected light and the transmitted light may pass through the polarization direction changing element so as to separate one of the reflected light and the transmitted light into waveband light having its polarization direction changed and waveband light not having its polarization direction changed; the waveband light having its polarization direction changed by the polarization direction changing element may be reflected from the polarization separation element as reflected light corresponding to one of the other two of the three colors; and the waveband light not having its polarization direction changed by the polarization direction changing element may pass through the polarization direction changing element as transmitted light corresponding to the other one of the other two of the three colors.

In such a color separation device of the second type according to the present invention, the color separation function element may be provided on an inclined surface of a first optical prism; the polarization direction changing element may be provided on a first inclined surface of a second optical prism; the polarization separation element may be provided on a second inclined surface of the second optical prism; and the first optical prism and the second optical prism may be arranged so that the color separation function element faces in parallel with the polarization direction changing element.

As described above, in the color separation devices according to the present invention, since the polarization separation elements are used to separate the three colors from the linearly polarized light, it is possible to perform color separation with a higher polarization degree.

According to the present invention, there is provided an imaging optical engine that comprises a color separation device of a first type according to the present invention; a first light valve, a second light valve, and a third light valve, each of the light valves receiving one of the three colors separated from the linearly polarized light by the color separation device and generating image light corresponding to the one of the three colors; and a color combining element combining images formed with each of the three colors at the first light valve, the second light valve, and the third light valve, respectively, so that color image light can be generated.

In such an imaging optical engine according to the present invention, the first light valve, the second light valve, and the third light valve may be reflective light valves that control polarization directions; illumination light that passes through the first polarization direction changing element, the first polarization separation element, and the second polarization direction changing element, respectively, and that is reflected by the second polarization separation element may be applied to the first light valve, image light reflected therefrom may be separated from the illumination light by the second polarization separation element so as to generate image light corresponding to a first color; illumination light that passes through the first polarization direction changing element, the first polarization separation element, the second polarization direction changing element, and the second polarization separation element, respectively, may be applied to the second light valve, image light reflected therefrom may be separated from the illumination light by the second polarization element so as to generate image light corresponding to a second color, the image light corresponding to the first color and the image light corresponding to the second color may be also combined by the second polarization separation element; illumination light that passes through the first polarization direction changing element, that is reflected by the first polarization separation element, that passes through the first polarization direction changing element again, and further passes through a third polarization separation element may be applied to the third light valve, image light reflected therefrom may be separated from the illumination light by the third polarization separation element so as to generate image light corresponding to a third color; and combined image light corresponding to both the first color and the second color may be further combined with the image light corresponding to the third color so that the color image light can be generated.

In the imaging optical engine according to the present invention, the first polarization separation element supported between the first polarization direction changing element and the second polarization direction changing element, the second polarization separation element, the third polarization separation element, and the color combining element may be arranged in the form a cross.

In the imaging optical engine according to the present invention, the first polarization separation element supported between the first polarization direction changing element and the second polarization direction changing element, the second polarization separation element, the third polarization separation element, and the color combining element may be arranged on orthogonal inclined surfaces of each of four right-angle prisms, and the orthogonal inclined surfaces of each of the four right-angle prisms may be arranged to face one another so that the first polarization separation element supported between the first polarization direction changing element and the second polarization direction changing element, the second. polarization separation element, the third polarization separation element, and the color combining element are integrated in the form of a block.

In the imaging optical engine according to the present invention, a third polarization direction changing element may be provided-on an outgoing optical path of the color image light generated by the color combining element so as to make polarization directions of the image light corresponding to the first color, the second color, and the third color in the color image light coincide with one another.

Further, the third polarization direction changing element may be detachably provided on the outgoing optical path of the color image light.

In the imaging optical engine according to the present invention, a polarizer may be detachably provided at the end of an outgoing optical path of the color image light generated by the color combining element.

In the imaging optical engine according to the present invention, a polarizer may be detachably provided on an illumination light incident side of the imaging optical engine.

According to the present invention, there is provided an imaging optical engine that comprises a color separation device of a second type according to the present invention; a first light valve, a second light valve, and a third light valve, each of the light valves receiving one of the three colors separated from the linearly polarized light by the color separation device and generating image light corresponding to one of the three colors; and a color combining element combining images formed with each of the three colors at the first light valve, the second light valve, and the third light valve, respectively, so that color image light can be generated.

In such an imaging optical engine according to the present invention, the first light valve, the second light valve, and the third light valve may be reflective light valves that control polarization directions; illumination light that passes through the color separation function element and the polarization direction changing element, respectively, and that is reflected by the polarization separation element may be applied to the first light valve, image light reflected therefrom may be separated from the illumination light by the polarization separation element so as to generate image light corresponding to a first primary light; illumination light that passes through the color separation function element, the polarization direction changing element, and the polarization separation element, respectively, may be applied to the second light valve, image light reflected therefrom may be separated from the illumination light by the polarization separation element so as to generate image light corresponding to a second color, the image light corresponding to the first color and the image light corresponding to the second color may be also combined by the polarization separation element; illumination light that is reflected by the color separation function element and that passes though an additional polarization separation element may be applied to the third light valve, image light reflected therefrom may be separated from the illumination light by the additional polarization separation element so as to generate image light corresponding to a third color; and combined image light corresponding to both the first color and the second color may be further combined with the image light corresponding to the third color so that the color image light can be generated.

In the imaging optical engine according to the present invention, the color separation function element and the polarization direction changing element configuring the first color separation member, the polarization separation element, the additional polarization separation element, and the color combining element may be arranged in the form of a cross.

In the imaging optical engine according to the present invention, the color separation function element and the polarization direction changing element configuring the first color separation member, the polarization separation element, the additional polarization separation element, and the color combining element may be arranged on orthogonal inclined surfaces of each of four right-angle prisms, and the color separation function element and the polarization direction changing element configuring the first color separation member, the polarization separation element, the additional polarization separation element, and the color combining element may be integrated in the form of a block.

In the imaging optical engine according to the present invention, an additional polarization direction changing element may be provided on an outgoing optical path of the color image light generated by the color combining element so as to make polarization directions of the image lights corresponding to the first color, the second color, and the third color in the color image light coincide with one another.

Further, the additional polarization direction changing element may be detachably provided on the outgoing optical path of the color image light.

In the imaging optical engine according to the present invention, a polarizer may be detachably provided at the end of an outgoing optical path of the color image light generated by the color combining element.

In the imaging optical engine according to the present invention, a polarizer may be detachably provided on an illumination light incident side of the imaging optical engine.

As described above, since the color separation devices according to the present invention are applied to the imaging optical engines that use light valves so as to control polarization directions, it is possible to obtain the color image (color image light) with high contrast.

In addition, in the imaging optical engines according to the present invention, since no polarization direction changing elements are arranged on optical paths between each of the light valves and a color combining part where each image light reflected from respective light valves are combined, it is possible to easily make the optical path length of each image light reflected from respective light valves and corresponding to each of the three colors, respectively, coincide with one another.

According to the present invention, there is provided a projection apparatus that comprises an imaging optical engine including a color separation device of a first type or of a second type according to the present invention and a projection lens. The color image light corresponding to the three colors is generated from the imaging optical engine and the color image light is projected onto a screen by the objection lens.

As described above, since the imaging optical engines according to the present invention are applied to the projection apparatus, it is possible to increase image quality of color images provided from the projection apparatus. Also, since no polarization direction changing elements that are inclined at an angle of 45 degrees are arranged on the optical paths between each of the light valves and the color combining part, it is possible to prevent the reduction in the quality of the color images projected from the projection apparatus, thus a lesser requirement exists for the design of the projection lens.

Therefore, according to the present invention, by suitably combining the first color separation member that comprises a polarization direction changing element and a polarization separation element/color separation function element and the second color separation member that comprises a polarization separation element, it is possible to realize a color separation device that can perform color separation so that the polarization direction of each of color components in the combined color image light is made coincident with one another.

Further, when such a color separation device according to the present invention is used, it is possible to realize an imaging optical engine that has imaging optical path length for respective colors, which optical paths lie between respective light valves and the color combining part, made coincident with one another since the polarization direction changing elements are eliminated from the optical paths between the respective light valves and the color combining part.

Further, when such an imaging optical engine is used, it is possible to realize a projection apparatus that can provide high quality color images since the color separation can be performed with a higher polarization degree.

In addition, according to the present invention, it is possible to realize an imaging optical engine and a projection apparatus of high quality by effectively improving the contrast of the color images to be projected on to a screen since the color separation can be performed with a higher degree.

Further, according to the present invention, it is possible to realize an adjustable projection apparatus that can adapt to the case when priority is given to the brightness over the contrast of the color images to be projected on to a screen, according to the user's intended purposes since an additional polarization direction changing element may be detachably provided on the outgoing optical path of the color image light.

Lastly, according to the present invention, since no inclined polarization direction changing elements are arranged on the optical path between each of the light valves and the color combining part, it is possible to realize a projection apparatus having a configuration that prevents the quality reduction of the combined color image.

DETAILED DESCRIPTION OF THE PREFERRED EMBODIMENTS

In the following, principles and embodiments of the present invention will be described with reference to the accompanying drawings.

Figure 1:
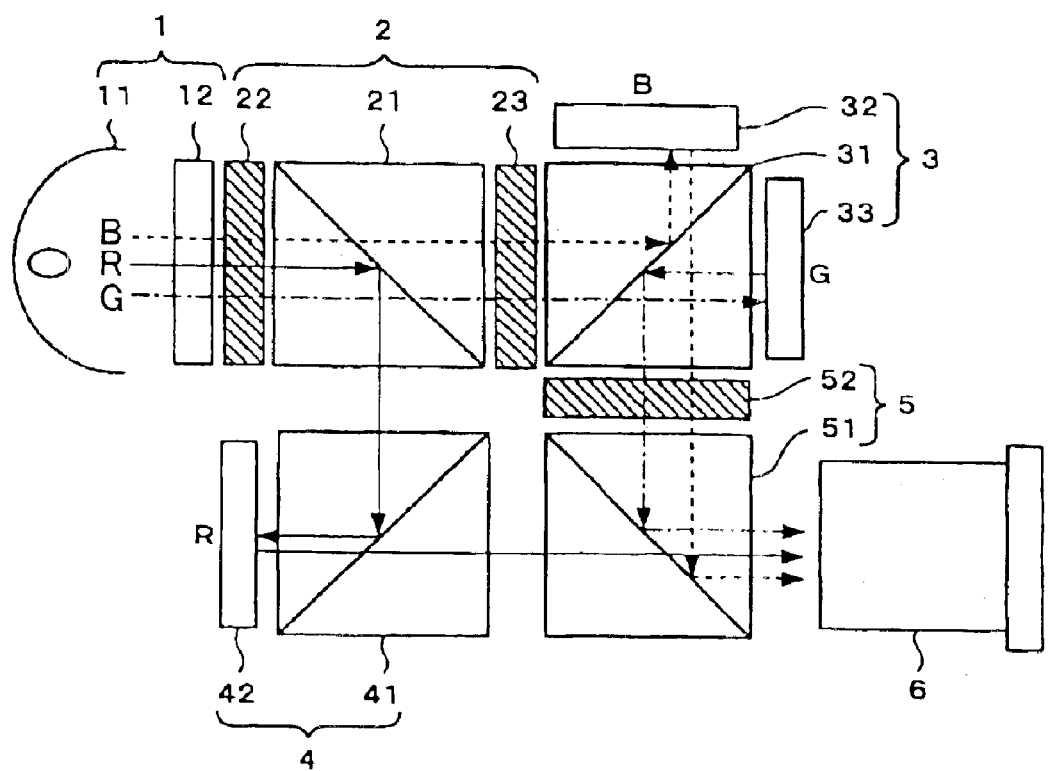
FIG. 1 is a schematic configuration of one example of a projection apparatus mounted on a three-panel liquid crystal projector according to the related art.
Figure 2:
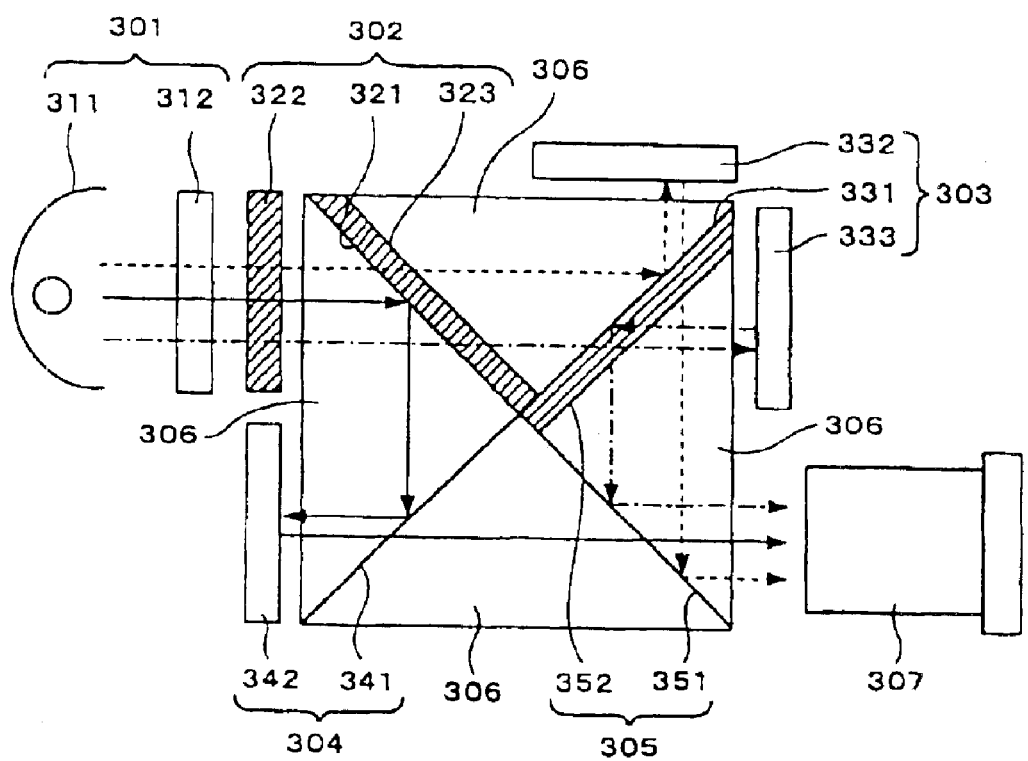
FIG. 2 is a schematic configuration of another example of a projection apparatus mounted on a liquid crystal projector device according to the related art.
Figure 3:
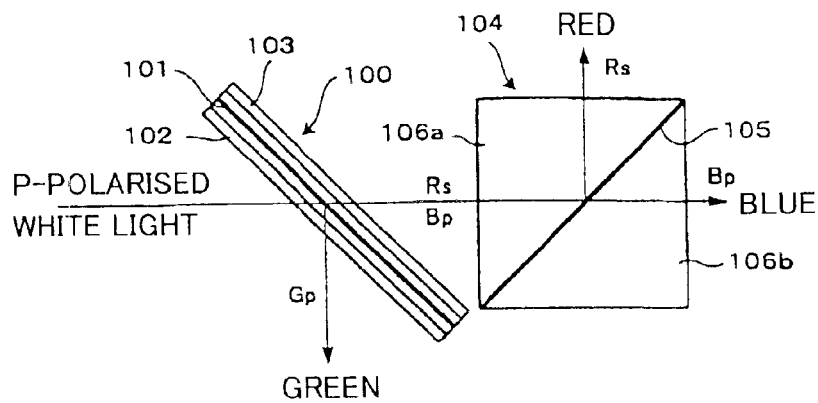
FIG. 3 shows a schematic configuration of a color separation device according to a first embodiment of the present invention.

FIG. 3 shows a schematic configuration of a color separation device according to a first embodiment of the present invention. The color separation device according to the first embodiment is provided with a first color separation member 100 having a first polarization separation element supported between two wavelength selective retarders, each wavelength selective retarder changing polarization direction of different predetermined wavelength regions of light and a second color separation member 104 configured from a second polarization separation element.

In particular, the first color separation member 100 includes a first polarization separation element 101, a first wavelength selective retarder 102, and a second wavelength selective retarder 103, each wavelength selective retarder changing the polarization direction of different predetermined wavelength regions of light. The first polarization separation element 101 is supported between the first wavelength selective retarder 102 and the second wavelength selective retarder 103. The second color separation member 104 is configured by the second polarization separation element 105.

Substantially linearly polarized white light is incident on the first wavelength selective retarder 102 at an angle of approximately 45 degrees. Waveband light having its polarization direction changed by passing through the first wavelength selective retarder 102 and waveband light not having its polarization direction changed by passing through the first wavelength selective retarder 102 are separated as reflected light and transmitted light by the first polarization separation element 101. The reflected light separated from the transmitted light passes through the first wavelength selective retarder 102 again and the transmitted light, which passes through the first polarization separation element 101, further passes through the second wavelength selective retarder 103, which is provided so as to face in parallel with the first wavelength selective retarder 102. Waveband light having its polarization direction changed by passing through the second wavelength selective retarder 103 and waveband light not having its polarization direction changed by passing through the second wavelength selective retarder 103 are further separated as reflected light and transmitted light, each having a different color, by the second polarization separation element 105.

In further detail, the color separation device shown in FIG. 3 includes a first polarization beam splitter (PBS) 100, which is configured from the first polarization separation element (for example, a polarization separation film) 101 supported between the first wavelength selective retarder 102, which is an element (G/M element) rotating the polarization direction of green waveband light (G) by 90 degrees, and the second wavelength selective retarder 103, which is an element (R/C element) rotating the polarization direction of red waveband light (R) by 90 degrees, and a second polarization beam splitter (PBS) 104, which is configured from the second polarization separation element (for example, a polarization separation film) 105 supported between two right-angle prisms 106a, 106b. The second PBS, i.e. the second color separation member 104 is arranged in the direction in which the illumination light passes through the first PBS, i.e. the first color separation member 100.

It is assumed that the light incident on the first PBS 100 is substantially linearly polarized white illumination light. (p-polarized light with respect to the first polarization separation element 101) generated from an illumination optical system (not shown). When this p-polarized white illumination light passes through the first wavelength selective retarder (G/M element) 102, only the green component of the light is s-polarized and is reflected from the first polarization separation element 101. The reflected s-polarized green light passes through the first wavelength selective retarder (G/M element) 102 again and it becomes a p-polarized green light (Gp). Whereas, the p-polarized magenta light (M), which passes through the first polarization separation element 101, further passes through the second wavelength selective retarder (R/C element) 103 and only the red component of the magenta light is s-polarized. Thus, the magenta light having the s-polarized red light component (Rs) and the p-polarized blue light component (Bp) is incident on the second PBS 104. The s-polarized red light (Rs) is reflected from the second polarization separation element 105 and the p-polarized blue light (Bp) passes through the second polarization separation element 105, thus the magenta light is separated into the s-polarized red light (Rs) and the p-polarized blue light (Bp). Accordingly, the color separation device according to the first embodiment of the present invention shown in FIG. 3 is able to separate the white light into three primary colors including red, blue, and green and direct respective light corresponding to each primary color to different directions.

Figure 4:
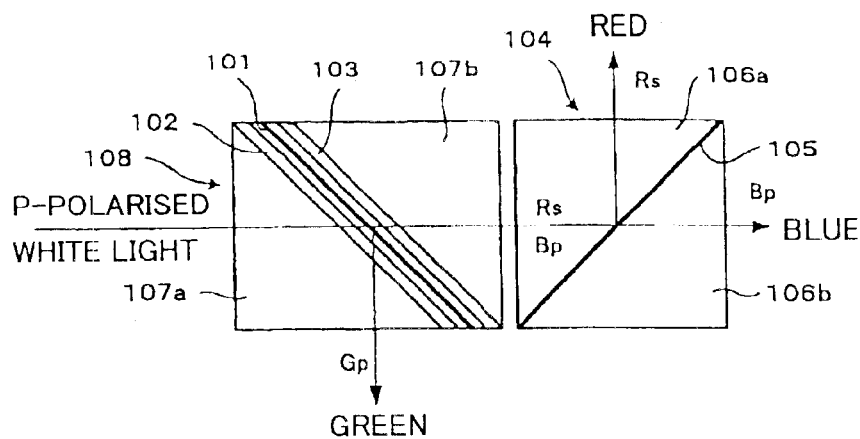
FIG. 4 shows a schematic configuration of a color separation device according to a second embodiment of the present invention.

FIG. 4 shows a schematic configuration of a color separation device according to a second embodiment of the present invention. The color separation device according to the second embodiment includes a first PBS 108 in the form of a prism, which includes the first polarization separation element (for example, a polarization separation film) 101 supported between the first wavelength selective retarder 102, i.e. the element (G/M element) rotating the polarization direction of the green waveband light (G) by 90 degrees and the second wavelength selective retarder 103, i.e. the element (R/C element) rotating the polarization direction of the red waveband light (R) by 90 degrees. The first PBS 108 further includes two right-angle prisms 107a, 107b supporting the combination of first polarization separation element 101, the first wavelength selective retarder 102, and the second wavelength selective retarder 103 between them.

Other configurations, operations, and functions of the color separation device according to the second embodiment are similar to those of the color separation device according to the first embodiment of the present invention, therefore the descriptions of which are omitted.

The following is a description of various combinations of wavelength selective retarders as other embodiments related to the color separation device shown in FIG. 3 and FIG. 4.

In the color separation devices shown in FIG. 3 and FIG. 4, the wavelength selective retarder may comprise an element (B/Y element) that changes the polarization direction of blue waveband light (B) by 90 degrees. Therefore, if the first PBS 100 (or 108) is configured by arranging the B/Y element as the first wavelength selective retarder 102 and the R/C element as the second wavelength selective retarder 103, when the p-polarized white illumination light is incident on the first PBS 100, the blue light (B) is reflected and separated at the first polarization separation element 101. In the yellow light (Y) that passes through the first polarization separation element 101, only the red component (R) of which is s-polarized by the R/C element and is incident on the second PBS 104. The s-polarized red light (Rs) is reflected from the second polarization separation element 105 and the p-polarized green light (Gp) passes through the second polarization separation element 105. Therefore, the yellow light is separated into the red light (Rs) and the green light (Gp).

Also, if the first PBS 100 (or 108) is configured by arranging the R/C element as the first wavelength selective retarder 102 and the G/M element as the second wavelength selective retarder 103, when the p-polarized white illumination light is incident on the first PBS 100, the red light (R) is reflected and separated at the first polarization separation element 101. In the cyan light (C) that passes through the first polarization separation element 101, only the green component (G) is s-polarized by the G/M element and is incident on the second PBS 104. The s-polarized green light (Gs) is reflected from the second polarization separation element 105 and the p-polarized blue light (Bp) passes through the second polarization separation element 105. Therefore, the cyan light is separated into the green light (Gs) and the blue light (Bp).

As mentioned above, since the color separation device according to the first and the second embodiments of the present invention includes the first PBS 100 (or 108) configured from the first polarization separation element 101 supported between two different types of wavelength selective retarders 102, 103 and the second PBS 104 configured from the second polarization separation element 105, it is possible to obtain the illumination light of respective primary colors in a very good polarization status.

Figure 5:
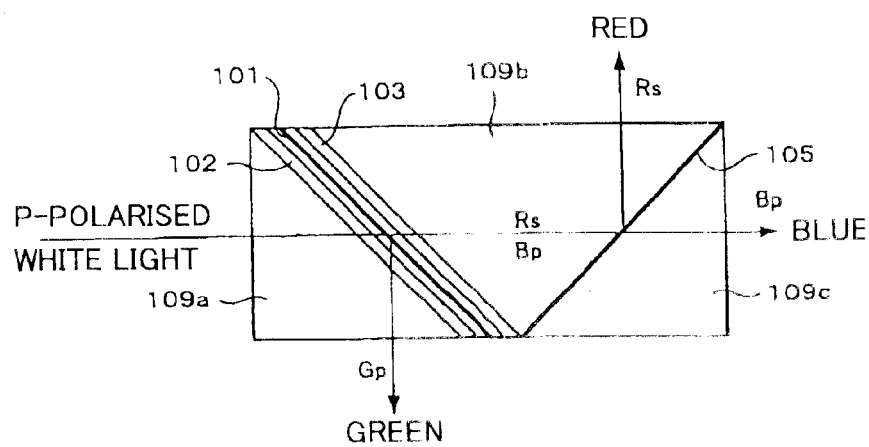
FIG. 5 shows a schematic configuration of a color separation device according to a third embodiment of the present invention.

FIG. 5 shows a schematic configuration of a color separation device according to a third embodiment of the present invention. The color separation device according to the third embodiment is configured from a first combined optical element and a second combined optical element. The first combined optical element includes the first wavelength selective retarder 102 adhesively provided on an inclined surface of an optical prism 109a and the first polarization separation element (for example, a polarization separation film) 101 stacked on the first wavelength selective retarder 102. The second combined optical element includes the second polarization separation element (for example, a polarization separation film) 105 adhesively provided on one of the two inclined surfaces of a right-angle prism 109b, which inclined surfaces are orthogonal to one another, and the second wavelength selective retarder 103 adhesively provided on the other inclined surface of the right-angle prism 109b. The first combined optical element and the second combined optical element are optically integrated so that the first polarization separation element 101 configuring the first combined optical element is adhesively connected to the second wavelength selective retarder 103 configuring the second combined optical element.

In other words, it can be said that the color separation device according to the third embodiment shown in FIG. 5 is configured such that the first PBS 108 and the second PBS 104 according to the second embodiment shown in FIG. 4 are integral. Three optical prisms (right-angle prisms) 109a, 109b, and 109c are used so as to arrange the first polarization separation element 101 and the second polarization separation element 105 in a V-shape. The first polarization separation element 101 is provided between the mating surfaces of the first optical prism 109a and the second optical prism 109b and the first polarization separation element 101 has the first wavelength selective retarder (for example, the G/M element) 102 and the second wavelength selective retarder (for example, the R/C element) 103, respectively, on its both sides. In other words, the first polarization separation element 101 having the first wavelength selective retarder 102 and the second wavelength selective retarder 103 on its both sides, respectively, is integrally supported between the first optical prism 109a and the second optical prism 109b. The second optical prism 109b has the second polarization separation element 105 provided on the other inclined surface other than the one having the second wavelength selective retarder 103. The second polarization separation element 105 is integrally supported between the second optical prism 109b and the third optical prism 109c.

Other configurations, operations, and function of the color separation device according to the third embodiment of the present invention are similar to those of the color separation device according to the first embodiment of the present invention, therefore the descriptions of which are omitted.

Figure 6:
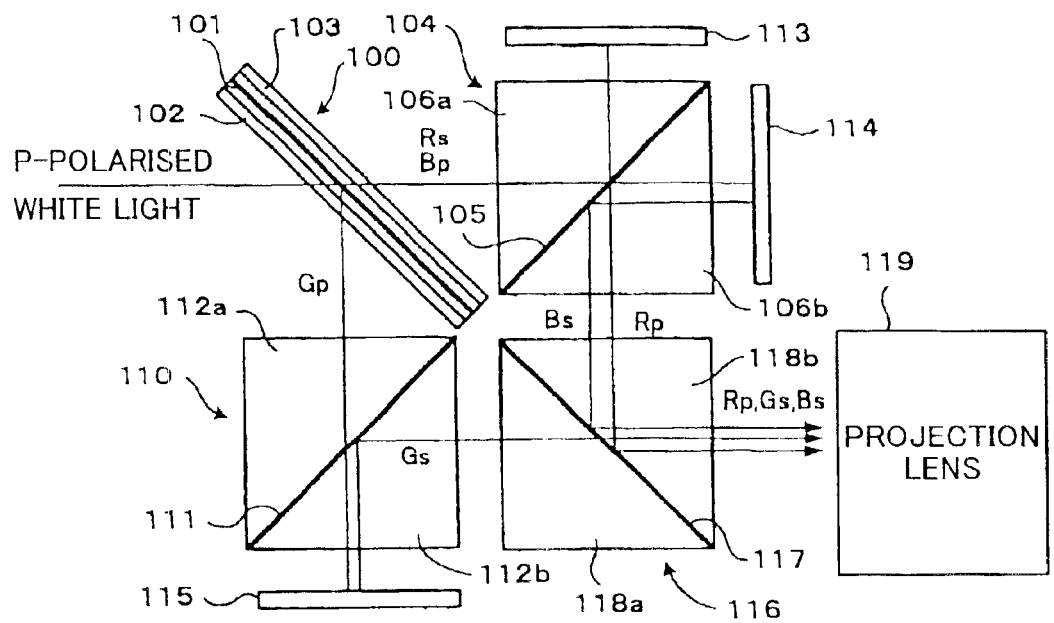
FIG. 6 shows a schematic configuration of an imaging optical engine of a projection apparatus according to a fourth embodiment of the present invention.

FIG. 6 shows a schematic configuration of an imaging optical engine in a projection apparatus according to a fourth embodiment of the present invention.

The imaging optical engine according to the fourth embodiment of the present invention is provided with the color separation device according to the first, the second, or the third embodiment of the present invention (in FIG. 6, the color separation device according to the first embodiment is used). Substantially linearly polarized illumination light is separated into three primary colors by the color separation device. The imaging optical engine according to the fourth embodiment is further provided with three light valves 113, 114, and 115, each corresponding to respective separated primary colors, and a color combining element 117 combining images formed with respective primary colors.

In other words, the imaging optical engine according to the fourth embodiment of the present invention is to control, with respect to pixels, the polarization direction of the linearly polarized light separated into three primary colors, i.e. red (R), green (G), and blue (B), using the color separation device according to the first, the second, or the third embodiment shown in FIG. 3, FIG. 4, and FIG. 5, respectively, at the light valves for respective primary colors depending on image signals. The light valves 113, 114, and 115 may be transmissive or reflective liquid crystal panels that control polarization directions (in FIG. 6, reflective liquid crystal panels are used). The illumination lights of a first primary color and a second primary color, which are separated by the second polarization separation element 105 configuring the color separation device, are applied to the first light valve 113 and the second light valve 114, respectively, and the image light reflected from respective light valves are combined by the second polarization separation element 105 and also the image light is separated from the illumination light by the second polarization separation element 105. The illumination light of a third primary color, which passes through the first wavelength selective retarder 102 configuring the color separation device, which reflected from the first polarization separation element 101, and which passes through the first wavelength selective retarder 102 again is applied to the third light valve 113 via the third polarization separation element 111. The image light reflected from the light valve 115 is separated from the illumination light by the third polarization separation element 111 and thus image light of the third color is generated. The two image lights, i.e. the image light with the first primary color and the second primary color combined together and the image light with the third color, are combined by the color combining element 117 such as a dichroic film so as to generate the color image (color image light).

Although not shown in the figure, as for the color combining element, a so-called cross prism, in which two color combining films are arranged in the form of a cross, that is commonly used in the conventional liquid crystal projector, or a dichroic mirror may be used for color combining. As described above, when reflective liquid crystal panels are used as light valves, in order to separate the illumination light and the image light, a separate polarization separation element may be used for the respective liquid crystal panel for optical path separation. The images of respective colors are combined by the color combining element such as a cross prism to obtain the color image.

In the imaging optical engine according to the fourth embodiment of the present invention, the color separation device according to the first, the second, or the third embodiment of the present invention is used. Since the primary colors are separated by the color separation device by the polarization separation elements and the wavelength selective retarders, it is possible to perform color separation with a high polarization degree. Therefore, when this color separation device is applied to an imaging optical engine using transmissive or reflective liquid crystal panels, both of which control the polarization directions, it is possible to obtain color images with high contrast. Also, when such an imaging optical engine is applied to a projection apparatus, it is possible to improve the image quality of the color image projected onto a screen.

In more detail, the imaging optical engine according to the fourth embodiment of the present invention shown in FIG. 6 is to separate the white illumination light into three primary colors, i.e. red, green, and blue, by using the color separation device configured as described in FIG. 3. This color separation device includes, for example, the first PBS 100 having the first polarization separation element (for example, a polarization separation film) 101 supported between the first wavelength selective retarder 102, for example, the element (G/M element) rotating the polarization direction of green waveband light by 90 degrees and the second wavelength selective retarder 103, for example, the element (R/C element) rotating the polarization direction of red waveband light by 90 degrees, all of which are arranged diagonally at an angle of 45 degrees, and the second PBS 104 having the second polarization separation element (for example, a polarization separation film) 105 supported between two right-angle prisms 106a, 106b. The second PBS 104 is arranged in the direction in which the illumination light passes through the first PBS 100. The light valves 113, 114 (for example, the reflective polarization control element or reflective liquid crystal panel, etc.) for the red component and for the blue component are provided on two orthogonal surfaces of the second PBS 104, respectively, which second PBS configures the color separation device. Further, in the direction of light reflected from the first PBS 100, there is arranged a third PBS 110, which includes the third polarization separation element (for example, a polarization separation film) 111 supported between two right-angle prisms 112a, 112b. In the direction in which the illumination light passes through the third PBS 110, there is provided the light valve 115 (for example, the reflective polarization control element and the reflective liquid crystal panels, etc.) for the green component. The reflected light from the light valve 113 for the red component and the light valve 114 for the blue component are combined into magenta light (M) by the second polarization separation element 105 of the second PBS 104. At the position where the outgoing direction of the magenta light (M) and the outgoing direction of the green light (G), which is separated from the illumination light by being reflected from the third polarization separation element 111 after being reflected from the light valve 115 for the green component, intersect, a dichroic prism 116 having the color combining element 117 (for example, a dichroic film) supported between two right-angle prisms 118a, 118b is provided. The dichroic film 117 of the dichroic prism 116 combines the magenta light (the light which combined the red image light and blue image light) with the green image light so as to generate the color image light.

It is noted that in the imaging optical engine according to the fourth embodiment of the present invention shown in FIG. 6, the first polarization separation element 101 supported between the first wavelength selective retarder 102 and the second wavelength selective retarder 103, the second polarization separation element 105, the third polarization separation element 111, and the color combining element (dichroic film) 117 are arranged in the form of a cross. In other words, since the plane surfaces including each element are arranged so as to intersect one another, it is possible to obtain a compact imaging optical engine.

Further, when a projection apparatus is to be configured using such imaging optical engine, an illumination optical system (not shown) may be provided on the incident side of the imaging optical engine and a projection lens 119 may be provided on the outgoing side of the imaging optical engine.

The following is the description of the operation of the imaging optical engine configured as shown in FIG. 6. It is assumed that the light incident on the first PBS 100 is, for example, substantially linearly polarized white illumination light (p-polarized light with respect to the first polarization separation element 101). When this p-polarized white illumination light passes through the first wavelength selective retarder (G/M element), only the green component of the illumination light is s-polarized and is reflected from the first separation element 101. The reflected s-polarized green light passes through the first wavelength selective retarder (G/M element) 102 again and it becomes p-polarized green light (Gp). Whereas the p-polarized magenta light (M: Rs+Bp), which passes through the first polarization separation element 101, further passes through the second wavelength selective retarder (R/C element) 103, and only the red light component of the magenta light is s-polarized. The magenta light having the s-polarized red light component (Rs) and the p-polarized blue light component (Bp) is incident on the second PBS 104. The s-polarized red light (Rs) is reflected from the second polarization separation element 105 and the p-polarized blue light (Bp) passes through the second polarization separation element 105, thus the magenta light is separated into the s-polarized red light and the p-polarized blue light.

As described above, after the white illumination light is separated into three primary colors of red (R), green (G), and blue (B), the red image light and the blue image light reflected from the light valve 113, 114, respectively, are combined and separated from the white illumination light by the second polarization separation element 105 of the second PBS 104 to generate the magenta image light (M: Rp+Bs). The magenta image light is directed to the dichroic prism 116. Meanwhile, the green image light (Gs) reflected from the light valve 115 is separated from the illumination light by the polarization separation element 111 of the third PBS 110 and is directed to the dichroic prism 116. The green image light (Gs) is combined with the magenta image light (M: Rp+Bs) by the color combining element (dichroic film) 117. In this combined image light, only the red component is p-polarized and the rest, i.e. the blue component and the green component are s-polarized.

Figure 7:
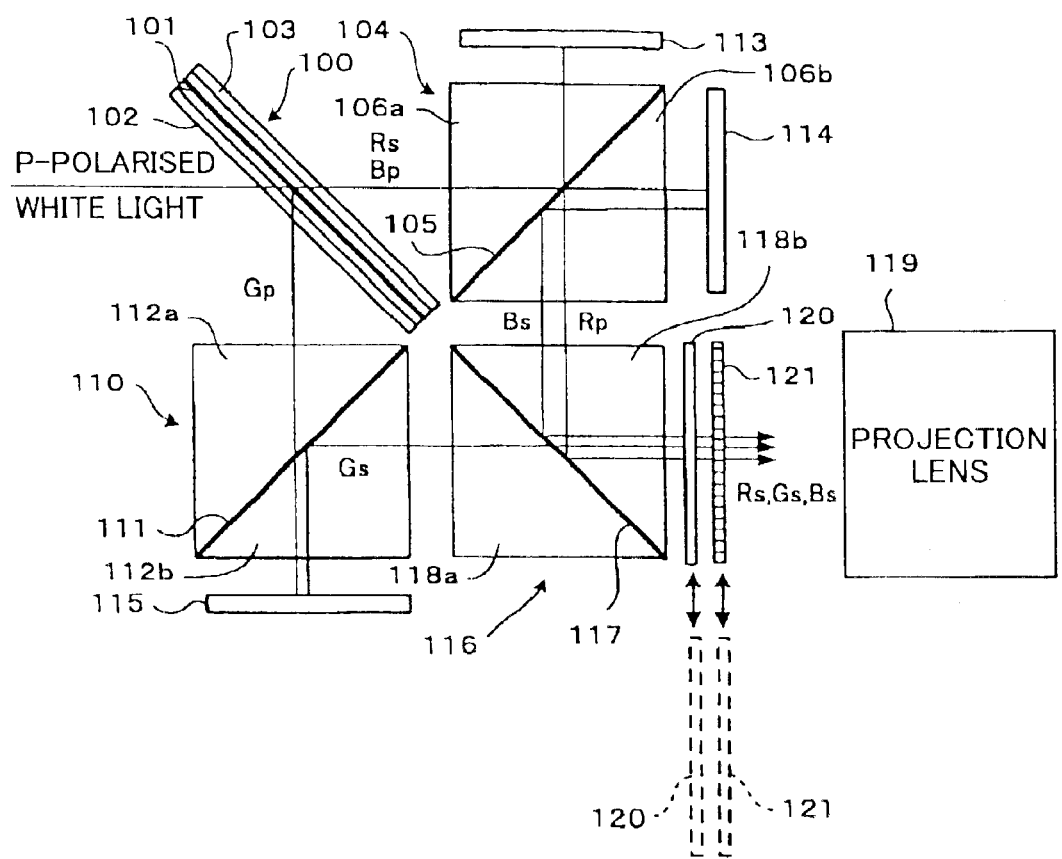
FIG. 7 shows a schematic configuration of an imaging optical engine in a projection apparatus according to a fifth embodiment of the present invention.

FIG. 7 shows a schematic configuration of an imaging optical engine in a projection apparatus according to a fifth embodiment of the present invention. The basic configuration of the imaging optical engine according to the fifth embodiment is similar to that of the imaging optical engine according to the fourth embodiment of the present invention shown in FIG. 6. Therefore, like reference numerals denote like elements, the operations and functions of which are the same.

In addition to the configurations of imaging optical engine according to the fourth embodiment of the present invention, the imaging optical engine according to the fifth embodiment of the present invention is provided with a third wavelength selective retarder 120, which is provided on the outgoing optical path of the color image light, in order to make the polarization directions of the image lights of respective primary colors coincide with one another. In such case, when the third wavelength selective retarder 120 is an element that changes the polarization of only the red light, the p-polarized red light component in the color image light is s-polarized and thus the polarization directions of all the primary colors in the color image light are coincided. This third wavelength selective retarder 120 is detachably provided on the outgoing optical path of the color image light so it can be removed when it is not necessary.

It is noted that in the imaging optical engine configured as shown in FIG. 7, a polarizer 121 is arranged downstream of the third wavelength selective retarder 120. For example, when the polarization directions of the red light, the blue light, and the green light of the color image light are made coincident with one another so as to be s-polarized, a polarizer that only passes through s-polarized light may be provided as the polarizer 121 so as to cut out the undesired p-polarized component which may be generated by passing through numerous optical elements and therefore, the reduction in contrast can be effectively avoided.

Although not shown in the figure, it is also possible to provide a polarizer on the incident side of the color separation device of the imaging optical engine. In such configuration, since the polarization components of the linearly polarized light that is incident on the color separation device can be improved, the color purity of the color separation is increased.

Further, if the polarizer is to be provided on the incident side of the imaging optical engine or on the outgoing optical path of the color image light, it is preferable that the polarizer be detachable. For example, if a projection apparatus is configured using such detachable polarizer 121 provided on the outgoing optical path of the color image light of the imaging optical device shown in FIG. 7, when priority is given to contrast, the polarizer may be provided and when priority is given to brightness, the polarizer may be removed as required. Further, in order to make the back focal length of the projection lens 119 equal, a dummy parallel plate, etc. may be inserted instead when the polarizer 121 is removed.

Figure 12:
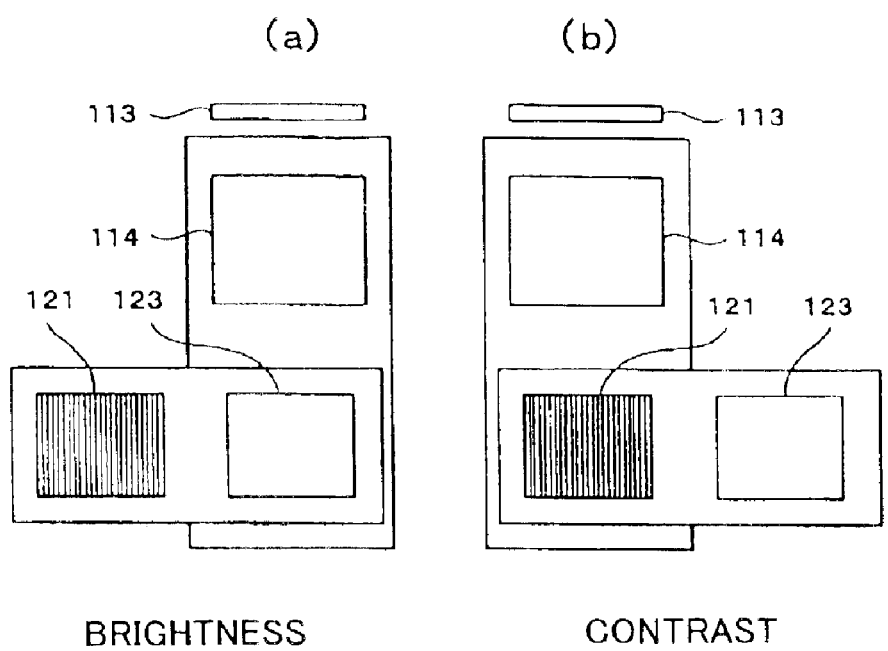
FIG. 12 shows a configuration, which enables the switching between a polarizer and a dummy parallel plate, provided on an outgoing optical path of the imaging optical engine according to the fifth, the seventh, and the ninth embodiments of the present invention shown in FIG. 7, FIG. 9, and FIG. 11, respectively.

In more detail, a member having the polarizer 120 and the dummy parallel plate 123 integrally formed thereon such as shown in FIG. 12 may be used. This member may be slid manually or by a driving device, etc. so as to switch between the polarizer 121 and the dummy parallel plate 123, etc. depending on user's request. The operation mechanism of the member is not limited to sliding and it is also possible to rotate the member. Alternatively, the polarizer 121 and the dummy parallel plate 123 may be fixed in a retainer such as a holder, etc., respectively, and according to the user's request, the holder including either the polarizer 121 or the dummy parallel plate 123 may be removed or replaced from outside of the projection apparatus.

The removal of the polarizer or the replacement of the polarizer with the dummy parallel plate as mentioned above is not limited to the projection apparatus provided with the color separation devices using wavelength selective retarders according to the present invention and it can also be applied to the projection apparatus according to the related art. In particular, in the projection apparatus using light valves of a polarization control type, the polarizer is provided on the optical path of a projection optical system in order to improve the contrast but the brightness is decreased by the transmission factor of the polarizer. For example, in a bright location, priority may be given to the brightness rather than the contrast. When the brightness is given priority when using the projection apparatus that uses the light valves of the polarization control type as mentioned above, the polarizer may be detachably provided on the optical path of the projection optical system and depending on the user's request, the polarizer may be removed by a simple operation in order to improve the brightness.

Figure 8:
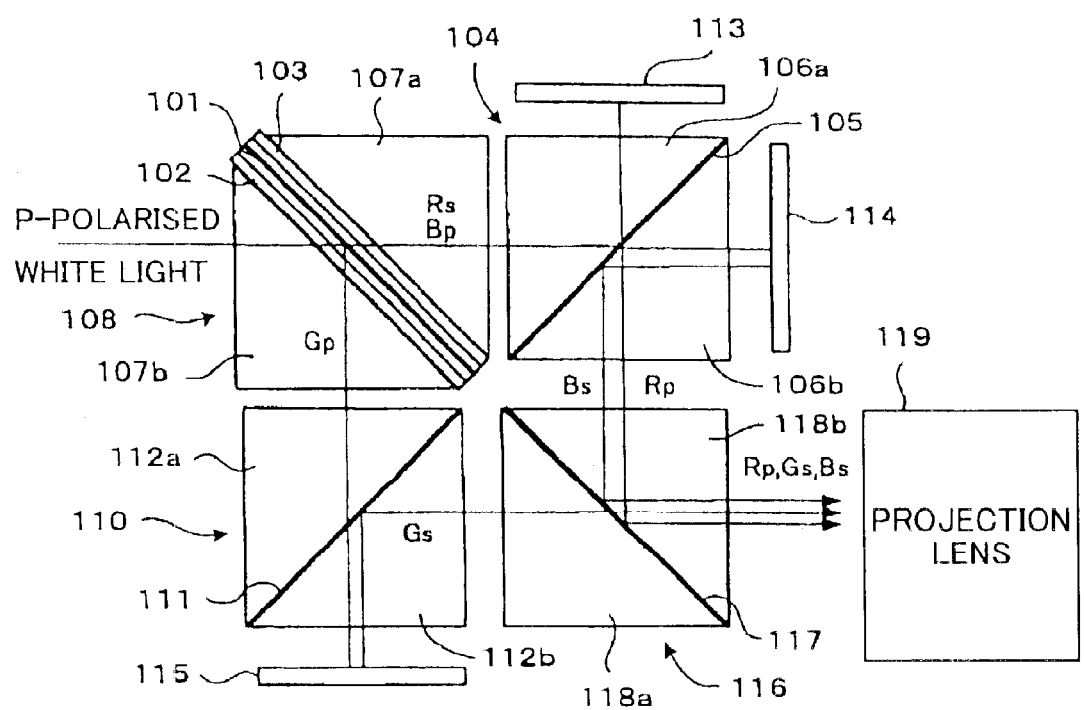
FIG. 8 shows a schematic configuration of an imaging optical engine in a projection apparatus according to a sixth embodiment of the present invention.

FIG. 8 shows a schematic configuration of an imaging optical engine in a projection apparatus according to a sixth embodiment of the present invention. The imaging optical engine according to the sixth embodiment of the present invention uses a color separation device having the same configuration as the second embodiment of the present invention shown in FIG. 4. Therefore, the color separation device includes the first PBS 108 in the form of a prism, which PBS 108 has the first polarization separation element (for example, the polarization separation film) 101 supported between the first wavelength selective retarder 102, which is the element (G/M element) rotating the polarization direction of green waveband light by 90 degrees, and the second wavelength selective retarder 103, which is the element (R/C element) rotating the polarization direction of red waveband light by 90 degrees. The combination of the first polarization separation element 101, the first wavelength selective retarder 102, and the second wavelength selective retarder 103 is further supported between two right-angle prisms 107a, 107b.

It is noted that configuration other than the first PBS 108, and operations and functions of the configurations other then the first PBS 108 of the imaging optical engine according to the sixth embodiment of the present invention are the same as the imaging optical engine according to the fourth embodiment of the present invention shown in FIG. 6 and therefore the descriptions of which are omitted.

Figure 9:
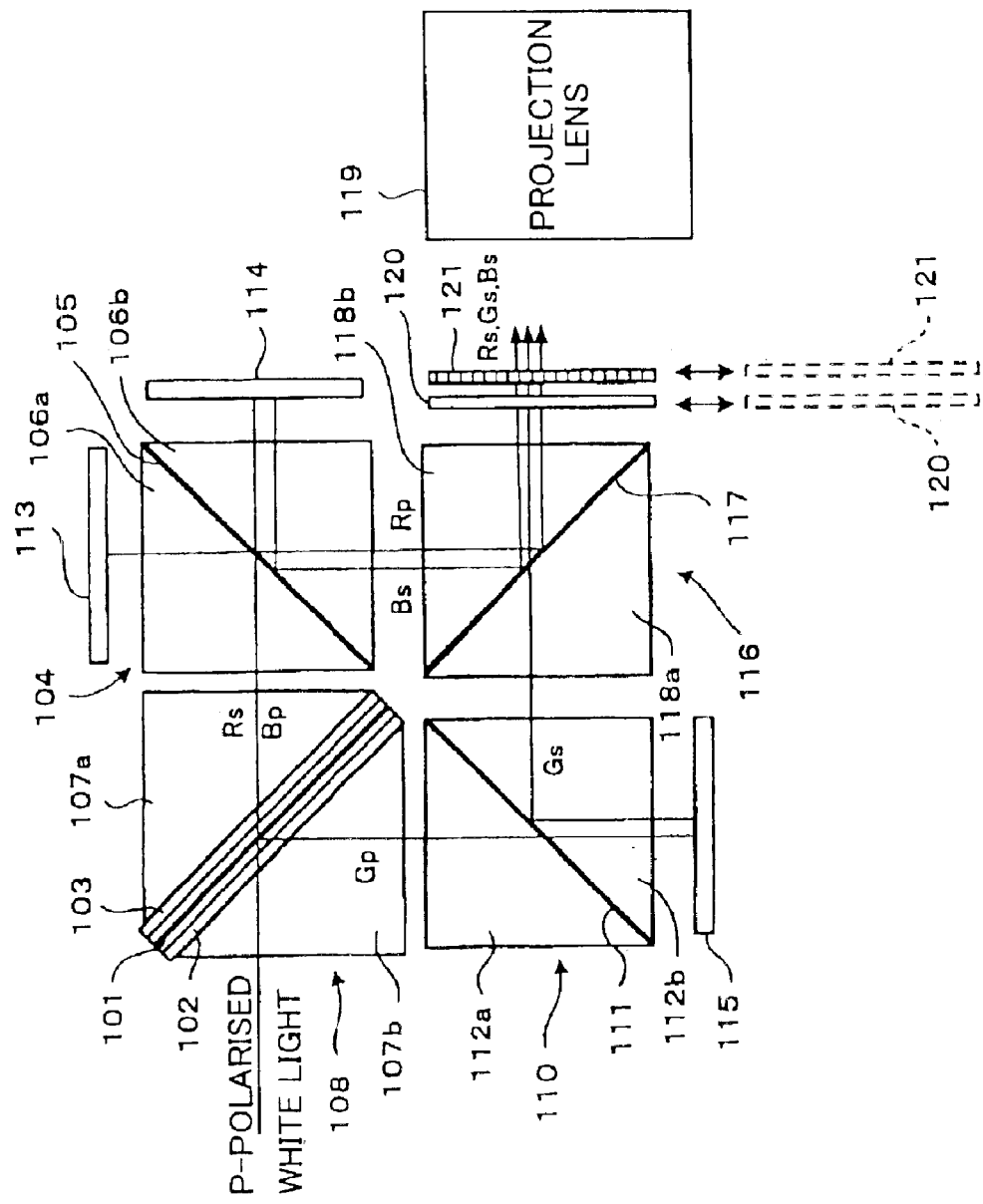
FIG. 9 shows a schematic configuration of an imaging optical engine in a projection apparatus according to a seventh embodiment of the present invention.

FIG. 9 shows a schematic configuration of an imaging optical engine of a projection apparatus according to a seventh embodiment of the present invention. The basic configuration of the imaging optical engine according to the seventh embodiment is the same as that of the imaging optical engine according to the sixth embodiment of the present invention shown in FIG. 8. Therefore, like reference numerals are denoted to like elements and operations of which are the same.

In addition to the configurations of the imaging optical engine according to the sixth embodiment of the present invention shown in FIG. 8, the imaging optical engine according to the seventh embodiment of the present invention is provided with a third wavelength selective retarder 120, which is detachably provided on the outgoing optical path of the color image light in order to make the polarization directions of the image light of respective primary colors coincide with one another, and further a polarizer 121, which is detachably provided downstream of the third wavelength selective retarder 120. The operations and functions of the third wavelength selective retarder 120 and the polarizer 121 are as described in the fifth embodiment of the present invention shown in FIG. 7. Also, when the polarizer is to be switched with the dummy parallel plate, the operations and the functions of such configurations are as described in the fifth embodiment of the present invention shown in FIG. 7.

Figure 10:
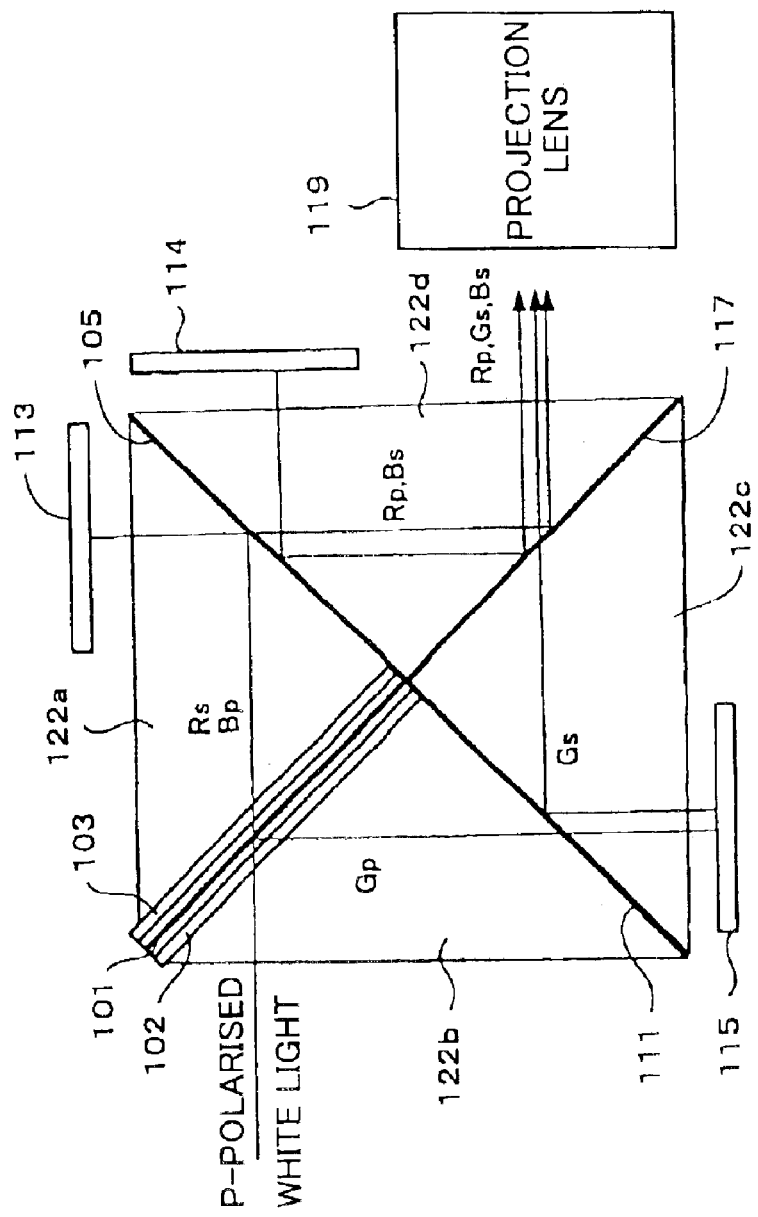
FIG. 10 shows a schematic configuration of an imaging optical engine in a projection apparatus according to an eighth embodiment of the present invention.

FIG. 10 shows a schematic configuration of an imaging optical engine of a projection apparatus according to an eighth embodiment of the present invention. The imaging optical engine according to the eighth embodiment has a configuration similar to that of the imaging optical engine according to the fourth embodiment shown in FIG. 6. However, the first polarization separation element (polarization separation film) 101 supported between the first wavelength selective retarder 102 and the second wavelength selective retarder 103, the second polarization separation element (polarization separation film) 105, the third polarization separation element (polarization separation film) 111, and the color combining element (dichroic film) 117 are formed on each pair of orthogonal inclined surfaces of four right-angle prisms 122a, 122b, 122c, and 122d that intersect one another and the orthogonal inclined surfaces of each right-angle prisms 122a, 122b, 122c, and 122d that intersect one another are arranged so as to face one another to make an integral configuration in the form of a block. In such configuration, since respective elements arranged in the form of a cross are held by four right-angle prisms 122a, 122b, 122c, and 122d, it is possible to reduce the number of prisms necessary as compared to the embodiments shown in FIG. 6 through FIG. 9 and this can effectively reduce the manufacturing cost.

It is noted that configuration, operations, and functions of the first polarization separation element (polarization separation film) 101, the first wavelength selective retarder 102, the second wavelength selective retarder 103, the second polarization separation element (polarization separation film) 105, the third polarization separation element (polarization separation film) 111, the color combining element (dichroic film) 117, and the light valves for respective colors 113, 114, and 115 are the same as that of the imaging optical engine according to the fourth embodiment of the present invention shown in FIG. 6 and therefore the descriptions of which are omitted.

Figure 11:
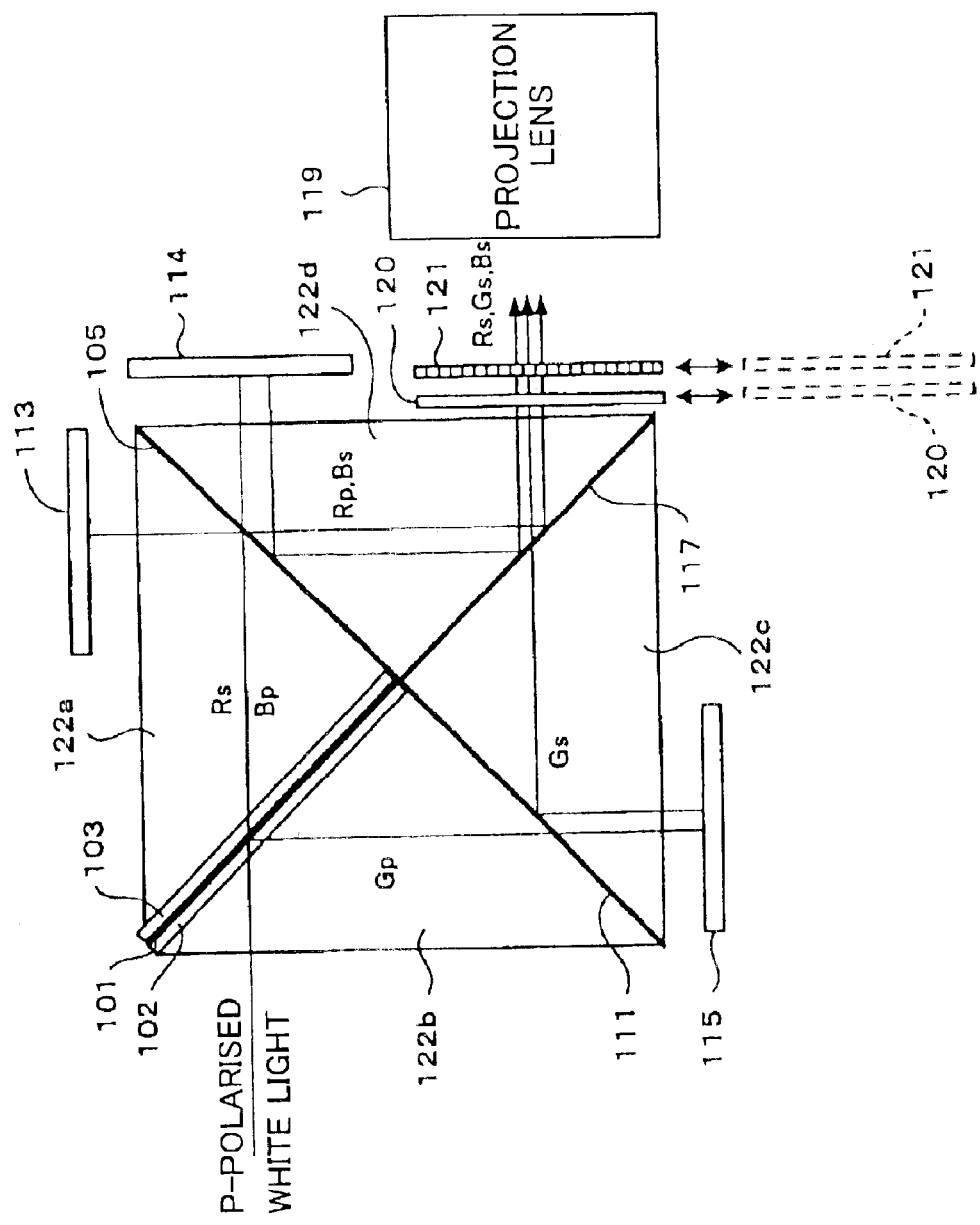
FIG. 11 shows a schematic configuration of an imaging optical engine in a projection apparatus according to a ninth embodiment of the present invention.

FIG. 11 shows a schematic configuration of an imaging optical engine of a projection apparatus according to a ninth embodiment of the present invention. The basic configuration of the imaging optical engine according to the ninth embodiment of the present invention is similar to that of the imaging optical engine according to the eighth embodiment of the present invention. Therefore, like reference numerals are denoted to like elements, and operations of which are the same.

In addition to the configuration of the imaging optical engine according to the eighth embodiment of the present invention shown in FIG. 10, the imaging optical engine according to the ninth embodiment is provided with a third wavelength selective retarder 120, which is detachably provided on the outgoing optical path of the color image light in order to make the polarization directions of the image light of respective colors coincide with one another, and further a polarizer 121, which is detachably provided downstream of the third wavelength selective retarder 120. The operations and functions of the third wavelength selective retarder 120 and the polarizer 121 are as described in the fifth embodiment of the present invention shown in FIG. 7. Also, when the polarizer is to be switched with the dummy parallel plate, the operation and the function of such a configuration are as described in the fifth embodiment of the present invention shown in FIG. 7.

In the imaging optical engine according to the various embodiments of the present invention shown in FIG. 6 through FIG. 11, the descriptions are given using the G/M element as the first wavelength selective retarder 102 and the R/C element as the second wavelength selective retarder 103. However, as mentioned in the first embodiment according to the present invention, it is apparent that various other wavelength selective retarders may be combined and used in order to perform color separation.

Figure 13:
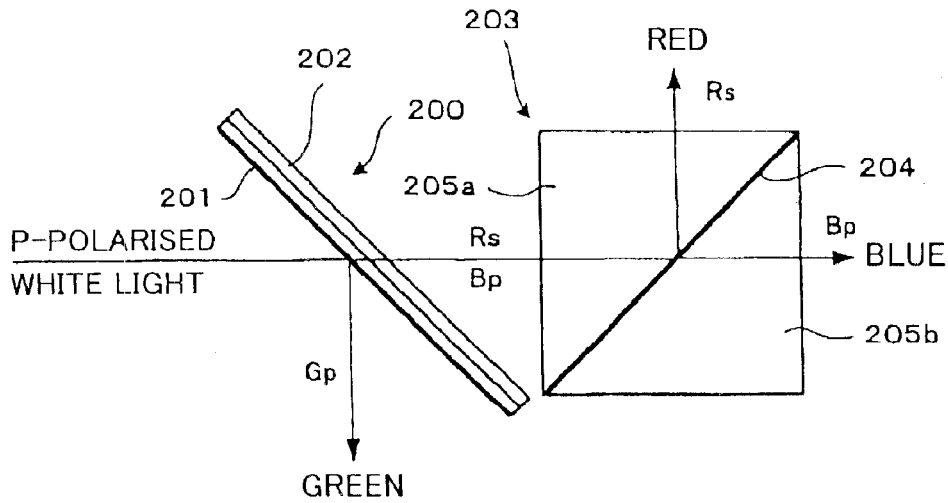
FIG. 13 shows a schematic configuration of a color separation device according to a tenth embodiment of the present invention.

FIG. 13 shows a schematic configuration of a color separation device according to a tenth embodiment of the present invention.

The color separation device according to the tenth embodiment of the present invention is provided with a first color separation member 200, which has a wavelength selective retarder that change polarization directions of different predetermined wavelength regions of light provided in parallel with a color separation function element that only reflects or transmits light of a certain color, and a second color separation member 203 configured from a polarization separation element.

In particular, the first color separation member 200 includes the color separation function element 201 that only reflects or transmits light of a certain color and the wavelength selective retarder 202 that changes the polarization direction of different predetermined wavelength regions of light, and the color separation function element 201 and the wavelength selective retarder 202 are provided in parallel with one another. The second color separation member 203 includes the polarization separation element 204.

Substantially linearly polarized light is incident on the color separation function element 201 at an angle of approximately 45 degrees so that reflected light and transmitted light of different colors are separated. One of the separated lights, i.e. the transmitted light, passes through the wavelength selective retarder 202 so as to obtain the light having waveband light having its polarization direction changed and waveband light not having its polarization direction changed of different colors. When incident on the polarization separation element 204, such light is further separated into reflected light and transmitted light.

In further detail, the color separation device shown in FIG. 13 includes the first color separation member 200 having the color separation function element (for example, a dichroic separation film) 201 that only, for example, reflects green waveband light (G) and the wavelength selective retarder 202, provided in parallel with the color separation function element 201, that rotates the polarization direction of red waveband light (R) by 90 degrees but does not change the polarization direction of cyan which is a complementary color of red, and the second color separation member (PBS) 203 having the polarization separation element (for example, the polarization separation film) 204 supported between two right-angle prisms 205a, 205b. The second color separation member 203 is arranged in the direction in which the light passes through the first color separation member 200.

It is assumed that the light incident on the first color separation member 200 is substantially linearly polarized white illumination light (for example, p-polarized light with respect to the polarization separation function element 201) generated from an illumination optical system (not shown). This p-polarized white illumination light is incident on the color separation function element (for example, the dichroic separation film) 201 at an angle of approximately 45 degrees. The color separation function element 201 separates the p-polarized green light (Gp), as reflected light, from the illumination light by bending the optical path of the green light by 90 degrees. Meanwhile, the p-polarized magenta light (M), which passes through the color separation function element 201, further passes through the wavelength selective retarder (R/C element) 202 and only the red light component of the magenta light is s-polarized. The magenta light having an s-polarized red light component (Rs) and a p-polarized blue light component (Bp) is incident on the second color separation member 203, which is a PBS, and the s-polarized red light (Rs) is reflected from the polarization separation element 204 and the p-polarized blue light (Bp) passes through the polarization separation element 204. Thus, the magenta light is separated into the s-polarized red light and the p-polarized blue light. Accordingly, in the color separation device shown in FIG. 13, the white light can be separated into three primary colors, i.e. green, blue, and red, and each light corresponding to respective primary colors can be directed to different directions.

Figure 14:
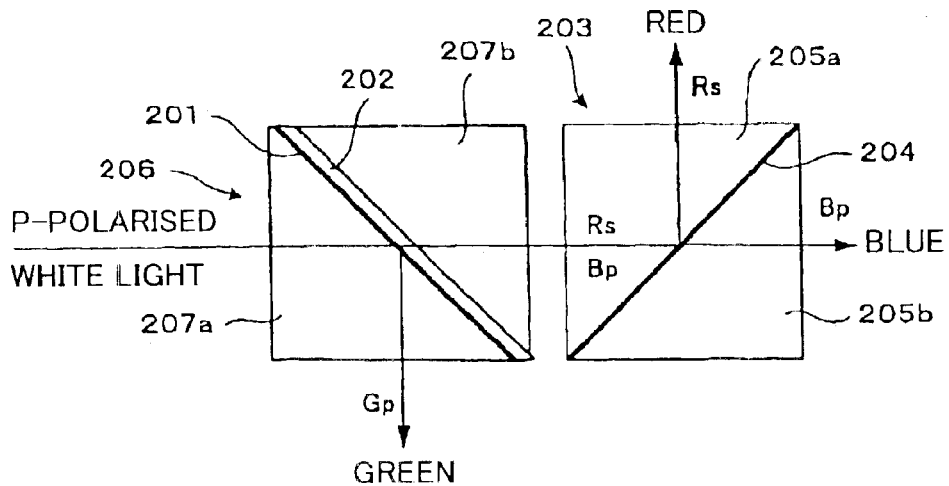
FIG. 14 shows a schematic configuration of a color separation device according to an eleventh embodiment of the present invention.

FIG. 14 shows a schematic configuration of a color separation device according to an eleventh embodiment of the present invention. The color separation device according to the eleventh embodiment includes a first color separation member 206 having the color separation function element (for example, a dichroic separation film) 201 that reflects, for example, the green light (Gp) by bending its optical path by 90 degrees and passes through magenta light (M) and the wavelength selective retarder 202, i.e. the element (R/C element) provided in parallel with the color separation function element 201, which element rotates the polarization direction of red waveband light by 90 degrees but does not change the polarization direction of cyan light which is the complementary color of red. The color separation function element 201 and the wavelength selective retarder 202 are supported between two right-angle prisms 207a, 207b.

Other configurations, operations, and functions of the eleventh embodiment of the present invention are similar to those of the color separation device according to the tenth embodiment of the present invention shown in FIG. 13, therefore descriptions of which are omitted.

The following is a description of various examples of a combination of the color separation function element 201 and the wavelength selective retarder 202.

In the above descriptions of the color separation device according to the tenth and the eleventh embodiments of the present invention, the color separation function element is described as an element reflecting the green waveband light but an element reflecting only the blue waveband light or an element reflecting only the red waveband light may also be used.

As for the wavelength selective retarder 202, an element changing the polarization direction of the blue waveband light by 90 degrees (B/Y element) or an element changing the polarization direction of the green waveband light by 90 degrees (G/M element), etc. may be used in addition to the R/C element. Any element can be selected for the color separation function element 201 as long as the light passing through the color separation function element 201 includes two primary colors out of three primary colors of R, G, and B and for the wavelength selective retarder 202 as long as the polarization direction of one of the two primary colors is changed.

Also it is possible to provide the wavelength selective retarder 202 in front of the color separation function element 201 so as to make the white illumination light pass through the wavelength selective retarder 202 first and then pass through or reflect from the color separation function element 201. In such configurations, the light reflected from the color separation function element is to pass through the wavelength selective retarder again.

As described above, since the color separation device according to the eleventh embodiment of the present invention includes the first color separation member 200 having the color separation function element 201 provided in parallel with the wavelength selective retarder 202, and the second color separation member (PBS) 203 configured from the polarization separation element 204, it is possible to obtain illumination light of respective primary colors having a good polarization status.

Figure 15:
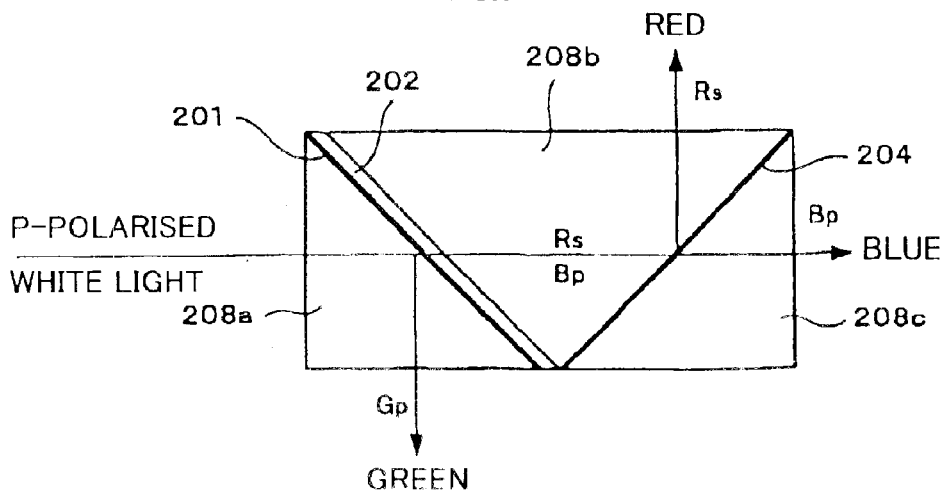
FIG. 15 shows a schematic configuration of a color separation device according to a twelfth embodiment of the present invention.

FIG. 15 shows a schematic configuration of color separation device according to a twelfth embodiment of the present invention. In the color separation device according to the twelfth embodiment of the present invention, the wavelength selective retarder 202 is provided on a first inclined surface of an optical prism 208b, the color separation device 204 is provided on a second inclined surface of the optical prism 208b, and the color separation function element 201 is provided on an inclined surface of another optical prism 208a. The optical prism 208a, 208b are arranged so that the color separation function element 201 and the wavelength selective retarder 202 face one another.

In other words, the color separation device in FIG. 15 has a configuration similar to that of color separation device according to the eleventh embodiment of the present invention shown in FIG. 14. However, the first color separation member 206 and the second color separation member (PBS) 203 are configured so as to be integral. Three optical prisms (right-angle prisms) 208a, 208b, and 208c are used so as to keep the color separation function element 201 supported facing the wavelength selective retarder 202 and the polarization separation element 204 in a V-shape. In more detail, the color separation function element 201 is arranged between the mating surfaces of the optical prisms 208a, 208b, the wavelength selective retarder (for example, the R/C element) 202 is adhesively arranged next to the color separation function element 201, and thus the color separation function element 201 and the wavelength selective retarder 202 are integrally arranged between the optical prism 208a and the optical prism 208b. The polarization separation element 204 is arranged between the second inclined surface of the optical prism 208b and an inclined surface of another optical prism 208c.

It is noted that element configuration, operations, and functions of the color separation device according to the twelfth embodiment of the present invention shown in FIG. 15 are as described in the color separation device according to the first embodiment of the present invention shown in FIG. 3, therefore the descriptions of which are omitted.

Figure 16:
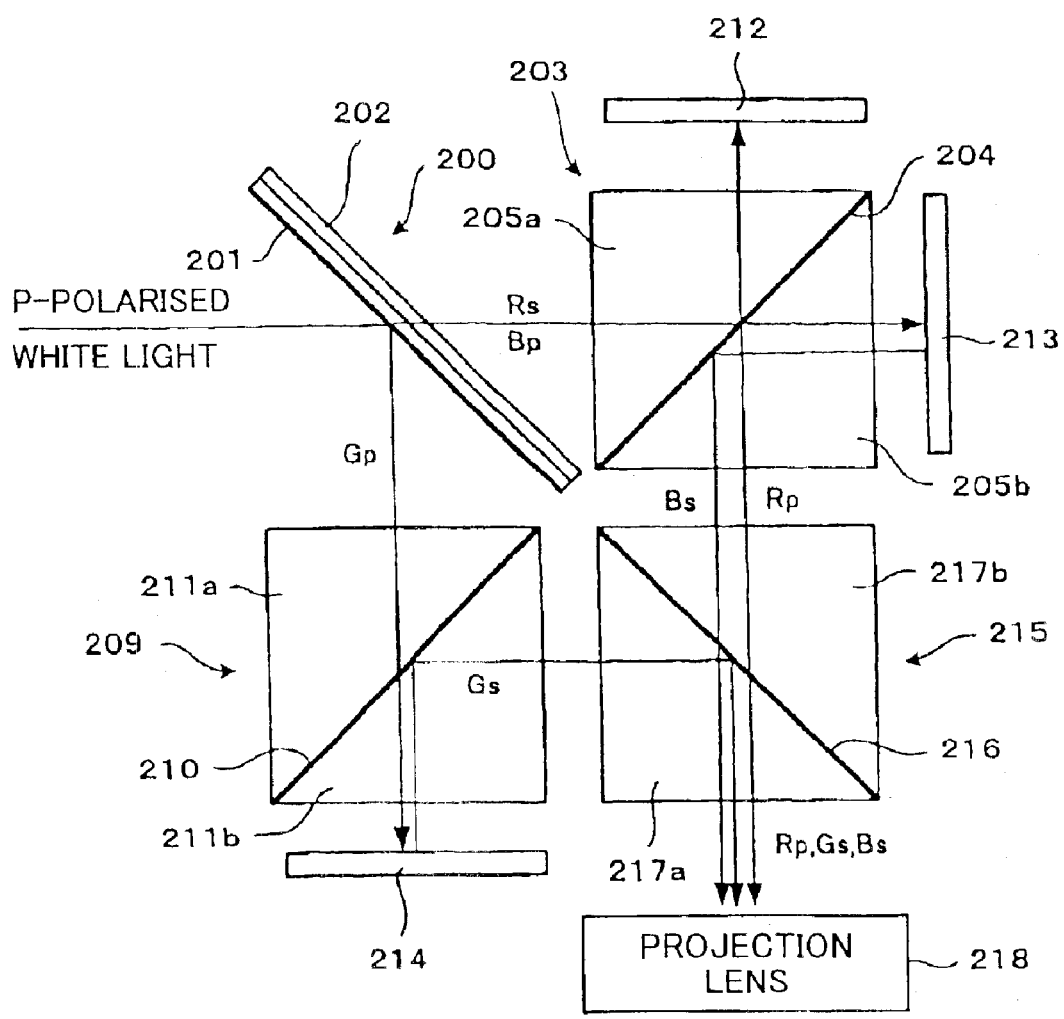
FIG. 16 shows a schematic configuration of an imaging optical engine according to a thirteenth embodiment of the present invention.

FIG. 16 shows a schematic configuration of an imaging optical engine according to a thirteenth embodiment of the present invention.

The imaging optical engine according to the thirteenth embodiment is provided with the color separation device according to the tenth, the eleventh, or the twelfth embodiment (in FIG. 16, the color separation device according to the tenth embodiment is used). Substantially linearly polarized illumination light is separated into three primary colors by the color separation device. The imaging optical engine according to the thirteenth embodiment further includes three light valves 212, 213, and 214, each corresponding to respective separated primary colors, and a color combining element 215 for combining each color image formed by the respective light valves.

In other words, the imaging optical engine according to the thirteenth embodiment of the present invention is to control, with respect to pixels, the polarization direction of the linearly polarized light separated into three primary colors, i.e. red (R), green (G), and blue (B) using the color separation device according to the tenth, the eleventh, or the twelfth embodiment of the present invention shown in FIG. 13, FIG. 14, and FIG. 15, respectively, at the light valves for respective primary colors depending on the image signals. The light valves 212, 213, and 214 may be transmissive or reflective liquid crystal panels that control polarization directions (in FIG. 16, reflective liquid crystal panels are used). The illumination lights of the first primary color and the second primary color, which are separated by the polarization separation element 204 of the second PBS 203 configuring the color separation device, are applied to the first light valve 212 and the second light valve 213, respectively, and the image light reflected from respective light valves are combined by the polarization separation element 204 and also the image light is separated from the illumination light by the polarization separation element 204. The illumination light of the third primary color separated by the color separation function element 201 configuring the first color separation member 200 of the color separation device is applied to the third light valve 214 via the second polarization separation element 210 and the image light reflected from the light valve 214 is separated from the illumination light by the second polarization separation element 210 and thus image light of the third color is generated. Two image lights, i.e. the image light with the first primary color and the second primary color combined together and the image light with the third color, are combined by the color combining element 216 and the color image (color image light) is generated.

Although not shown in the figure, as for the color combining element, a so-called cross prism, in which two color combining films are arranged in the form of a cross, that is commonly used in the liquid crystal projector according to the related art or a dichroic mirror may be used to combine primary colors. As described above, when reflective liquid crystal panels are used as light valves, in order to separate the illumination light and the image light, a separate polarization separation element may be used for the respective liquid crystal panel for optical path separation. The images of respective colors are combined by the color combining element such as a cross prism to obtain the color image.

In the imaging optical engine according to the thirteenth embodiment of the present invention, the color separation device according to the tenth, the eleventh, or the twelfth embodiment of the present invention is used. Since the primary colors are separated by the color separation device using the color separation function element, the wavelength selective retarder, and the polarization separation element, it is possible to perform color separation with a high polarization degree. Therefore, when this color separation device is applied to an imaging optical engine using transmissive or reflective liquid crystal panels, both of which control the polarization directions, it is possible to obtain color images with high contrast Also, when such an imaging optical engine is applied to a projection apparatus, it is possible to improve the image quality of the color image projected onto a screen.

In more detail, the imaging optical engine according to the thirteenth embodiment shown in FIG. 16 is to separate the white illumination light into three primary colors, i.e. red, green, and blue, by using the color separation device configured as described in FIG. 13. This color separation device includes the first color separation member 200 and the second color separation member (PBS) 203. The first color separation member 200 includes the color separation function element (for example, a dichroic separation film) 201 that only reflects the green waveband light and the wavelength selective retarder 202, i.e. the element (R/C element) provided in parallel with the color separation function element 201, which R/C element rotates the polarization direction of the red waveband light by 90 degrees. The second color separation member 203 includes the polarization separation element 204 supported between two right-angle prisms 205a, 205b. The second color separation member (PBS) 203 is arranged in the direction in which the illumination light passes through the first color separation member 200. The light valves 212, 213 (for example, reflective polarization control elements or reflective liquid crystal panels, etc.) for the red light (R) and for the blue light (b) are provided on two orthogonal surfaces of the second color separation member (PBS) 203, respectively. Further, in the direction of light reflected from the color separation function element (for example, a dichroic separation film) 201 of the first color separation member 200, there is arranged a second PBS 209 having a second polarization separation element (for example, a polarization separation film) 210 supported between two right-angle prisms 211a, 211b. In the direction in which the illumination light passes through the second PBS 209, there is provided the light valve 214 (for example, a reflective polarization control element or a reflective liquid crystal panel, etc.) for green light (G). The reflected light from the light valve 212 for the red light (R) and the light valve 213 for the blue light (B) are combined into magenta light (M) by the polarization separation element 204 of the second color separation member (PBS) 203. At the position where the outgoing direction of the magenta light and the outgoing direction of the green light, which is separated from the illumination by reflecting from the second polarization separation element 210 after reflected from the light valve 214 for the green light (G), intersect, the dichroic prism 215 having the color combining element (a dichroic film) 216 supported between two right-angle prisms 217a, 217b is provided. This dichroic film 216 of the dichroic prism 215 combines the magenta light (the light which combined the red light and the blue light) with the green light as to generate and output color image light.

It is noted that in the imaging optical engine according to the thirteenth embodiment shown in FIG. 16, the color separation function element 201 and the wavelength selective retarder 202, both configuring the color separation device, the polarization separation element 204, the second polarization separation element 210, and the color combining element (dichroic film) 216 are arranged in the form of a cross. In other words, since the plane surfaces including each element are arranged so as to intersect one another, it is possible to obtain a compact imaging optical engine.

Further, when a projection apparatus is to be configured using such an imaging optical engine, an illumination optical system (not shown) may be provided on the incident side of the imaging optical engine and a projection lens 218 may be provided on the outgoing direction of the color image light combined at the dichroic prism 215.

The following is the description of an operation of the imaging optical engine configured as shown in FIG. 16. It is assumed that the light incident on the first color separation member 200 is, for example, substantially linearly polarized white illumination light (p-polarized light with respect to the polarization separation element 204) generated from an illumination optical system (not shown). This p-polarized white illumination light is incident on the color separation function element (for example, a dichroic separation film)

201 at an angle of 45 degrees. The color separation function element 201 separates the p-polarized green light (Gp) as reflected light from the illumination light by-bending the optical path of the green light by 90 degrees. Meanwhile, the p-polarized magenta light (M: Rs+Bp), which passes through the color separation function element 201, further passes through wavelength selective retarder (R/C element) 202 and only the red light component of the magenta light is s-polarized. Thus the magenta light having the s-polarized red light component (Rs) and the p-polarized blue light component (Bp) are incident on the second color separation member 203, which is a PBS, and the s-polarized red light (Rs) is reflected from the polarization separation element 204 and the p-polarized blue light (Bp) passes through the polarization separation element 204. Thus, the magenta light is separated into the s-polarized red light and the p-polarized blue light.

As described above, after the white illumination light is separated into three primary colors of red (R), blue (B), and green (G), the red image light and the blue image light reflected from the light valve 212, 213, respectively, are combined and separated from the white illumination light by the polarization separation element 204 of the second color separation member (i.e. PBS) 203 to generate the magenta image light (M: Rs+Bp). The magenta image light is directed to the dichroic prism 215. Meanwhile, the green image light (Gs) reflected from the light valve 214 is separated from the illumination light by the polarization separation element 210 of the second PBS 209 and is directed to the dichroic prism 215. The green image light (Gs) is combined with the magenta image light by the color combining element (dichroic film) 216. In this combined image light, only the red component is p-polarized and the rest, i.e. the blue component and the green component, are s-polarized.

Figure 17:
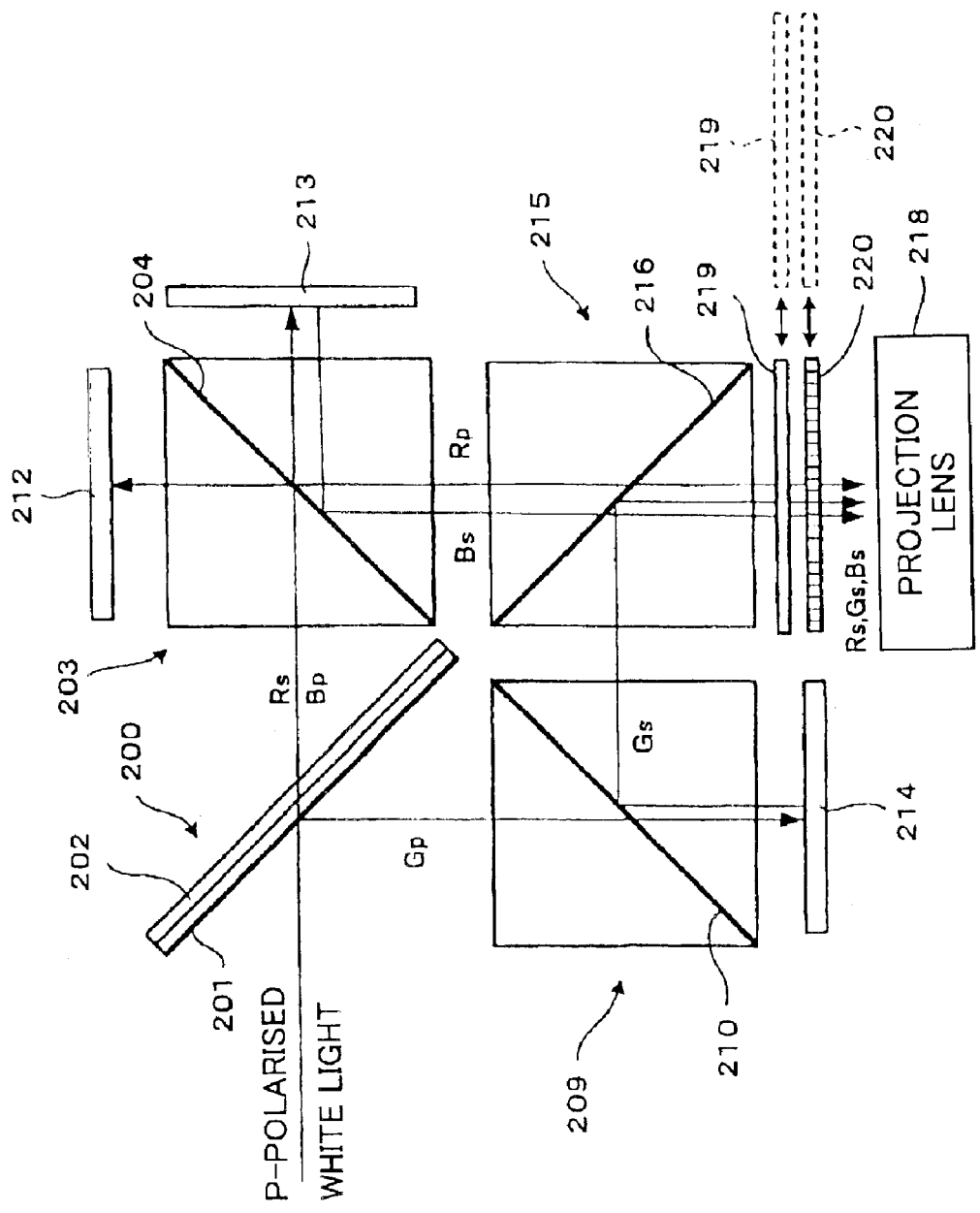
FIG. 17 shows a schematic configuration of an imaging optical engine according to a fourteenth embodiment of the present invention.

FIG. 17 shows a schematic configuration of an imaging optical engine in a projection apparatus according to a fourteenth embodiment of the present invention. The basic configuration of the imaging optical engine according to the fourteenth embodiment is similar to that of the imaging optical engine according the thirteenth embodiment shown in FIG. 16. Therefore, like reference numerals are denoted to like elements, and operations and functions of which are the same.

In addition to the configurations of the imaging optical engine according to the thirteenth embodiment shown in FIG. 16, the imaging optical engine according to the fourteenth embodiment of the present invention is provided with a second wavelength selective retarder 219, which is provided on the outgoing optical path of the color image light in order to make the polarization directions of the image light of respective primary colors coincide with one another. In such case, when the second wavelength selective retarder 219 is an element that changes the polarization direction of only the red light, the p-polarized red light component in the color image light is s-polarized and thus the polarization direction of the image light of respective primary colors can be coincident. This second wavelength selective retarder 219 is detachably provided on the outgoing optical path of the color image light, so it can be removed when it is not necessary.

It is noted that in the imaging optical engine configured as shown in FIG. 17, a polarizer 220 is arranged downstream of the second wavelength selective retarder 219. For example, when the polarization directions of the red light, the blue light, and the green light of the color image light are made coincident with one another so as to be s-polarized light, a polarizer that only passes through s-polarized light may be provided as the polarizer 220 so as to cut out the undesired p-polarized component which may be generated by passing through numerous optical elements. Therefore, the reduction in contrast can be effectively avoided.

Although not shown in the figure, it is also possible to provide a polarizer on the incident side of the color separation device of the imaging optical engine. In such a configuration, since the polarization components of the linearly polarized light that is incident on the color separation device can be improved, the color purity of the color separation is increased.

Further, if the polarizer is to be arranged on the incident side of the imaging optical engine or on the outgoing optical path of the color image light, it is preferable that the polarizer be detachable. For example, if a projection apparatus is configured using such detachable polarizer 220 provided on the outgoing optical path of the color image light of the imaging optical device shown in FIG. 17, when priority is given to the contrast, the polarizer may be provided and when priority is given to the brightness, the polarizer may be removed as required. Further, in order to make the back focal length of the projection lens 218 equal, a dummy parallel plate, etc. may be inserted instead when the polarizer 220 is removed.

In more detail, as for the configuration that enables the switching between the polarizer and the dummy parallel plate, the configuration shown in FIG. 12, which configuration is described according to the fifth embodiment of the present invention, may be used. In particular, a member having the polarizer and the dummy parallel plate integrally formed thereon as shown in FIG. 12 is provided and this member may be slid manually or by a driving device, etc. so as to switch between the polarizer and the dummy parallel plate, etc. depending on the user's request. The operation mechanism of the member is not limited to sliding but it is also possible to rotate the member. Alternatively, the polarizer and the dummy parallel plate may be fixed in a retainer such as a holder, etc., respectively, and according to the user's request, the holder including either the polarizer or the dummy parallel plate may be removed or replaced from outside of the projection apparatus.

Figure 18:
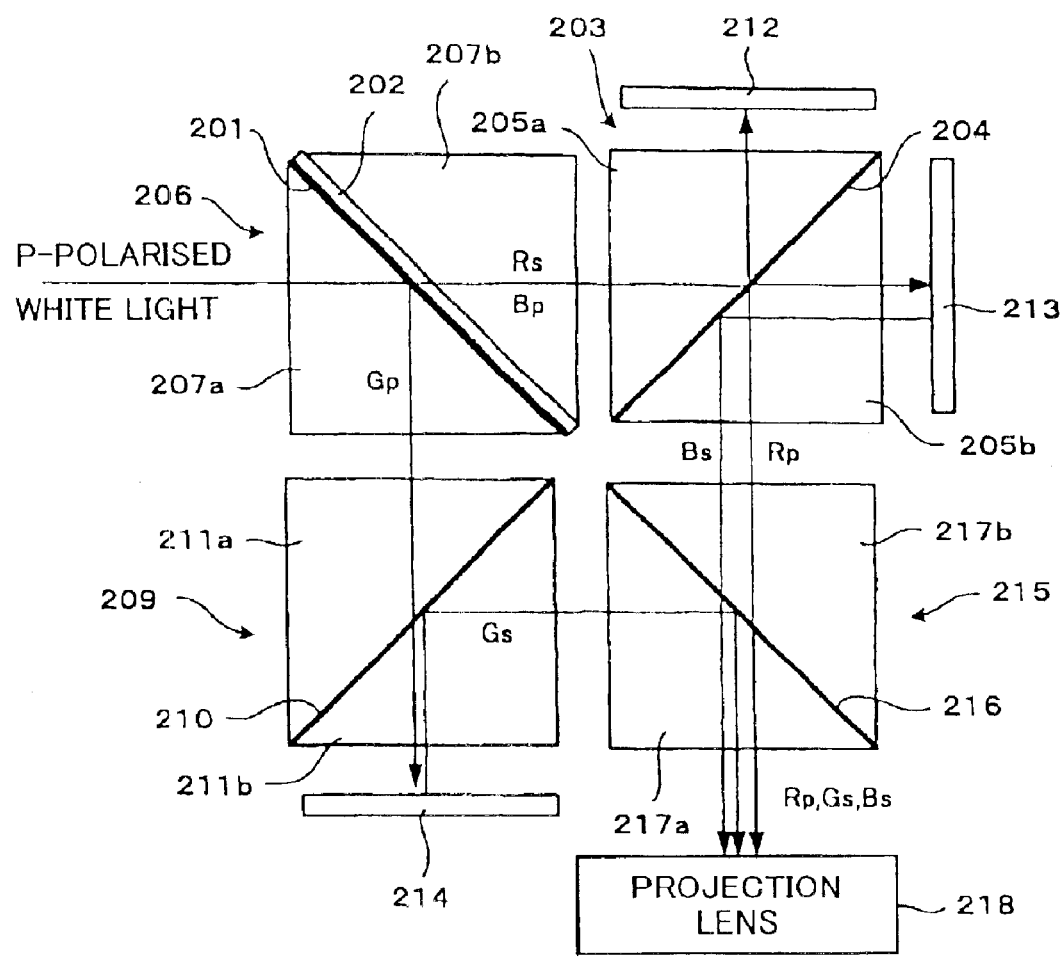
FIG. 18 shows a schematic configuration of an imaging optical engine according to a fifteenth embodiment of the present invention.

FIG. 18 shows a schematic configuration of an imaging optical engine of a projection apparatus according to a fifteenth embodiment of the present invention. The imaging optical engine according to the fifteenth embodiment uses the color separation device having the same configurations as that of the color separation device according to the eleventh embodiment of the present invention shown in FIG. 14. This color separation device includes the first color separation function element 206 having the color separation function element (for example, a dichroic separation film) 201 that reflects, for example, the green light by bending its optical path by 90 degrees and passes through the magenta light and the wavelength selective retarder 202, i.e. the element (R/C element) provided in parallel with the color separation function element 201, which R/C element rotates the polarization direction of red waveband light by 90 degrees and which does not change the polarization direction of cyan light that is the complementary color of red. The color separation function element 201 and the wavelength selective retarder 202 are supported between two right-angle prisms 207a, 207b.

Configuration, operations, and functions of the fifteenth embodiment of the present invention other than the first color separation member 206 in the form of a prism are similar to those of the imaging optical engine according to the thirteenth embodiment shown in FIG. 16, therefore descriptions of which are omitted.

Figure 19:
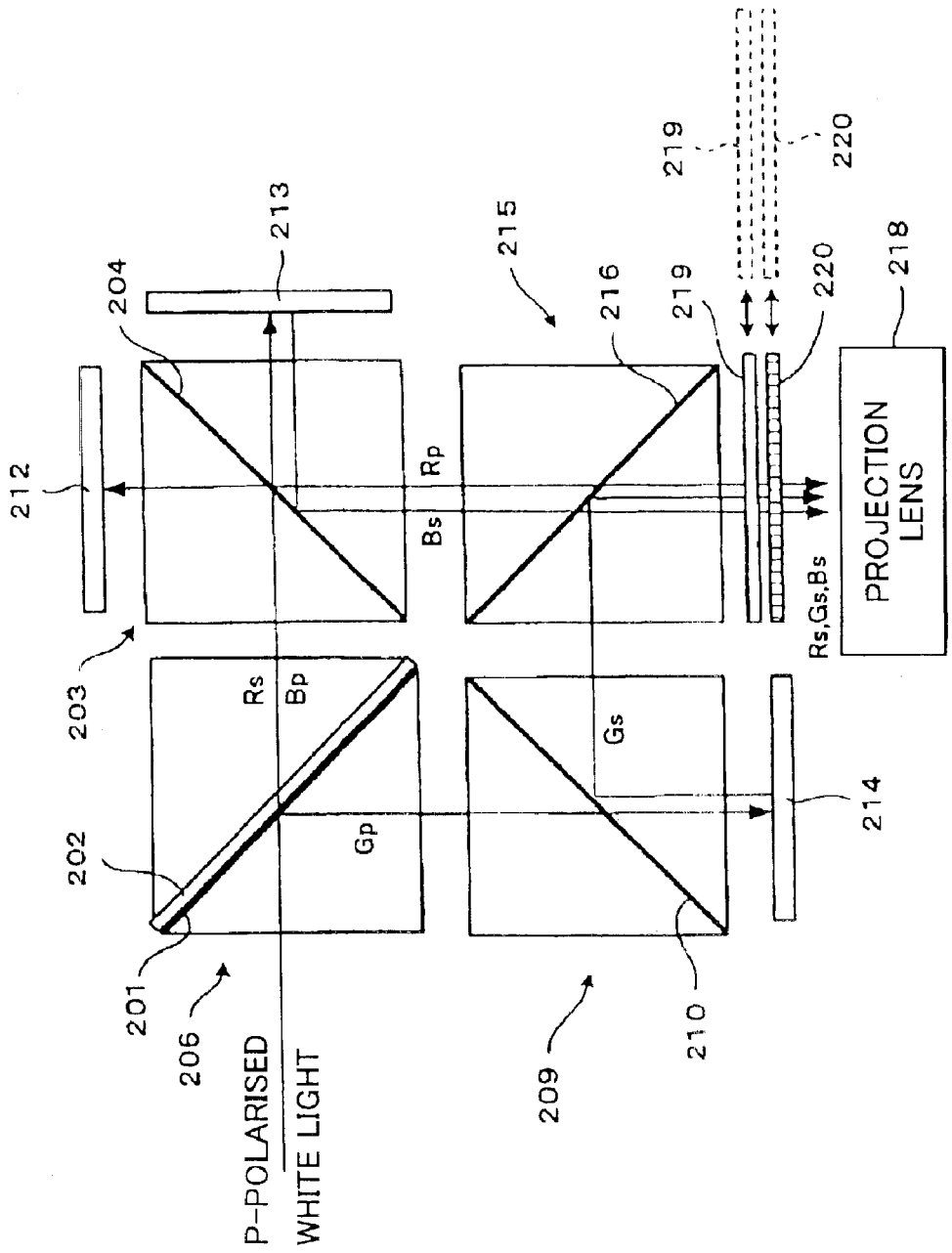
FIG. 19 shows a schematic configuration of an imaging optical engine according to a sixteenth embodiment of the present invention.

FIG. 19 shows a schematic configuration of an imaging optical engine of a projection apparatus according to a sixteenth embodiment of the present invention. The basic configuration of the imaging optical engine according to the sixteenth embodiment is similar to that of the imaging optical engine according to the fifteenth embodiment of the present invention shown in FIG. 18, therefore, like reference numerals are denoted to like elements and operations of which are the same.

In addition to the configurations of the imaging optical engine according to the fifteenth embodiment of the present invention shown in FIG. 18, the imaging optical engine according to the sixteenth embodiment of the present invention is provided with a second wavelength selective retarder 219, which is detachably provided on the outgoing optical path of the color image light in order to make the polarization directions of the image light of respective primary colors coincide with one another, and further a polarizer 220, which is detachably provided downstream of the second wavelength selective retarder 219. The operations and functions of the second wavelength selective retarder 219 and the polarizer 220 are as described in the fourteenth embodiment of the present invention shown in FIG. 17. Also, when the polarizer is to be switched with the dummy parallel plate, the operations and the functions of such configurations are as described in the fourteenth embodiment of the present invention shown in FIG. 17.

Figure 20:
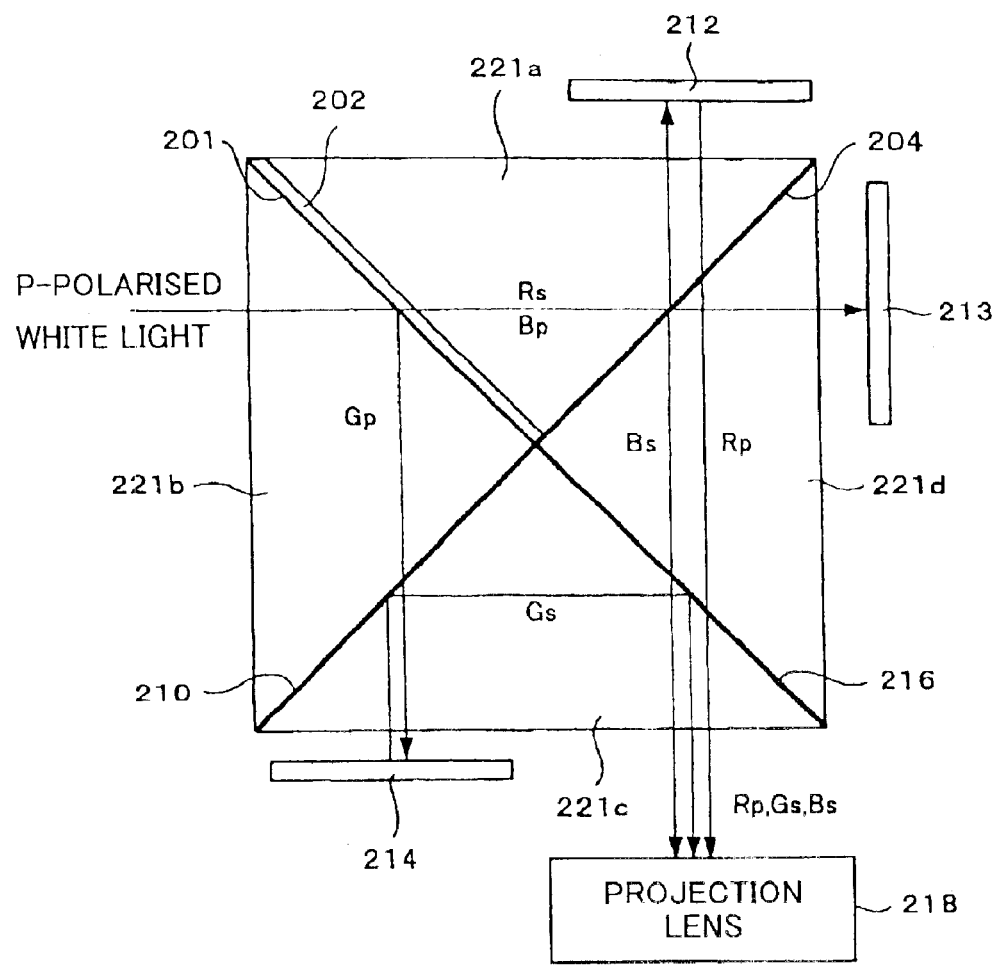
FIG. 20 shows a schematic configuration of an imaging optical engine according to a seventeenth embodiment of the present invention.

FIG. 20 shows a schematic configuration of an imaging optical engine in a projection apparatus according to a seventeenth embodiment of the present invention. The imaging optical engine according to the eighteenth embodiment has a configuration similar to that of the imaging optical engine according to the thirteenth embodiment of the present invention shown in FIG. 16. However, the color separation function element 201 and wavelength selective retarder 202, both configuring the color separation device, the polarization separation element 204, the second polarization separation element 210, and the color combining element (dichroic film) 216 are provided on each pair of orthogonal inclined surfaces of four right-angle prisms 221a, 221b, 221c, and 221d that intersect one another and the orthogonal inclined surfaces of each right-angle prisms 221a, 221b, 221c, and 221d that intersect one another are arranged so as to face one another to make an integral configurations in the form of a block. In such a configuration, since respective elements arranged in the form of a cross are held by four right-angle prisms 221a, 221b, 221c, and 221d, it is possible to reduce the number of prisms necessary as compared to the embodiments shown in FIG. 16 through FIG. 19 and this can effectively reduce the manufacturing cost.

It is noted that configuration, operations, and functions of the color separation function element (dichroic separation film) 201 and the wavelength selective retarder 202, both configuring the color separation device, the polarization separation element (polarization separation film) 204, the second polarization separation element (polarization separation film) 210, the color combining element (dichroic film) 216, and the light valves 212, 213, and 214 for respective colors are as described in the thirteenth embodiment of the present invention shown in FIG. 16 and therefore, the descriptions of which are omitted.

Figure 21:
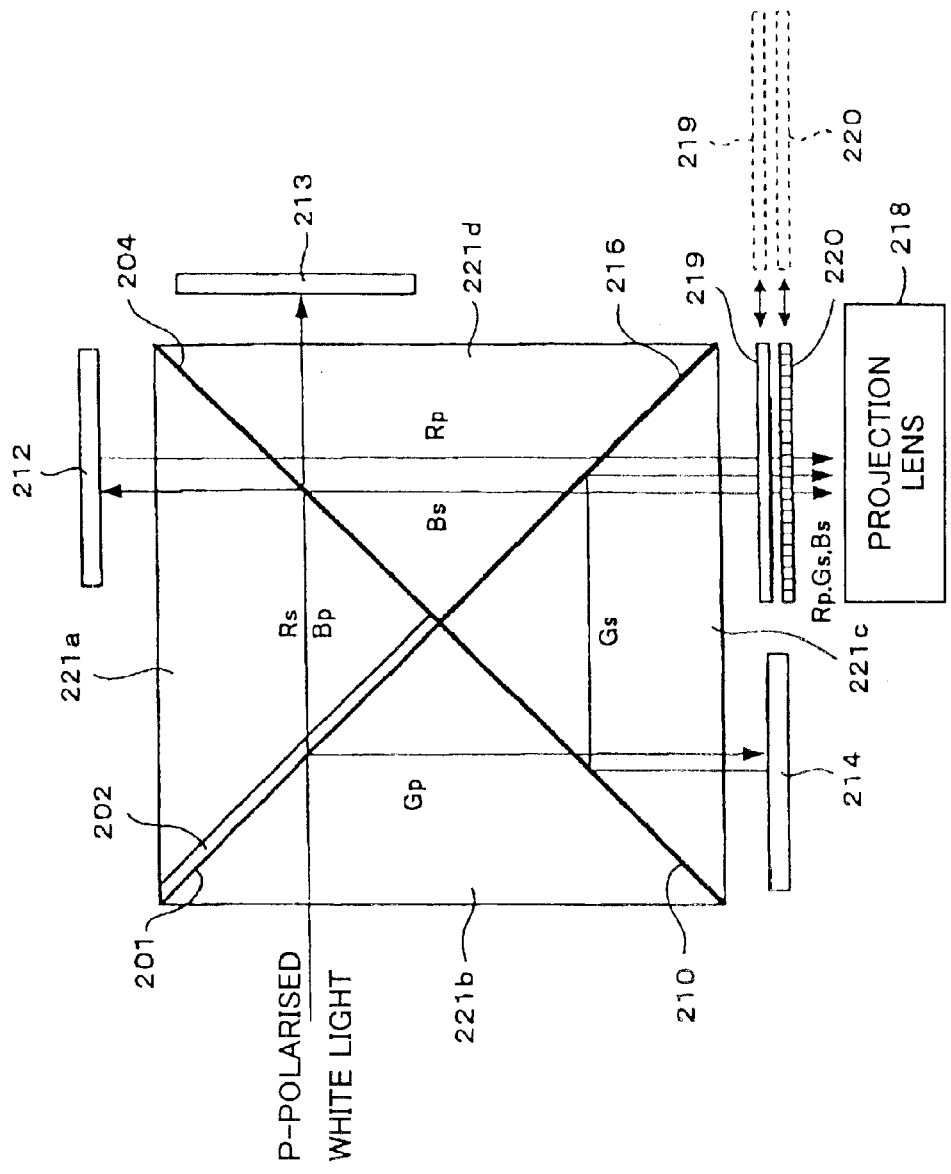
FIG. 21 shows a schematic configuration of an imaging optical engine according to an eighteenth embodiment of the present invention.

FIG. 21 shows a schematic configuration of an imaging optical engine of a projection apparatus according to an eighteenth embodiment of the present invention. The basic configuration of the imaging optical engine according to the eighteenth embodiment is similar to that of the imaging optical engine according to the seventeenth embodiment shown in FIG. 20. Therefore, like reference numerals are denoted to like elements, and operations of which are the same.

In addition to the configuration of the imaging optical engine according to the seventeenth embodiment shown in FIG. 20, the imaging optical engine according to the eighteenth embodiment of the present invention is provided with a second wavelength selective retarder 219, which is detachably provided on the outgoing optical path of the color image light in order to make the polarization directions of the image light of respective primary colors coincide with one another, and further a polarizer 220, which is detachably provided downstream of the second wavelength selective retarder 219. The operations and functions of the second wavelength selective retarder 219 and the polarizer 220 are as described in the fourteenth embodiment of the present invention shown in FIG. 17. Also, when the polarizer is to be switched with the dummy parallel plate, the operations and the functions of such configurations are as described in the fourteenth embodiment of the present invention shown in FIG. 17.

In the above descriptions of the imaging optical engines according to the thirteenth to the eighteenth embodiment of the present invention, the color separation function element 201 is described as a green light reflective dichroic separation film and the wavelength selective retarder 202 as a R/C element but it is apparent that any one of various combinations of a color separation function element and a wavelength selective retarder may be used in order to perform color separation as mentioned in the tenth embodiment of the present invention.

The following is a detailed description of embodiments according to the present invention where one of the imaging optical engines described above is applied to a projection apparatus. The configuration of the imaging optical engine is one of the configurations shown in FIG. 6 through FIG. 11, or FIG. 16 through FIG. 21. The projection apparatus is configured by providing an illumination optical system on the illumination light incident side of the imaging optical engine and a projection lens 119 or 218 on the outgoing side of the color image light. The illumination optical systems are omitted in FIG. 6 through FIG. 11 and FIG. 16 through FIG. 21.

The illumination optical system may be formed from a light source and a condenser element for illumination (illumination lens) that collimates light flux uniformly, etc. A halogen lamp, a xenon lamp, a metal halide lamp, and a very-high-pressure mercury lamp, etc. may be used as the light source. Also, in order to obtain good illuminance, a reflector may be provided to reflect and collect emanated light from the light source.

In order to obtain linearly polarized light in one direction as the illumination light, a polarization changer, which is configured by combining a PBS array and a wavelength plate and used conventionally, may be used. A linear polarizer may be inserted downstream of the polarization changer in the illumination optical system when improvement in the polarization degree and assurance in contrast performance are required. Further, it is effective when the polarization degree is improved by using the PBS. When the linear polarizer is used, heat may be generated by light absorption and thus the performance may be decreased but when the PBS is used, unwanted polarization components may be reflected or transmitted and thus it is possible to better suppress the generation of heat due to the light absorption. Therefore, it can be said that the PBS is more effective. In particular, the PBS of a plate type so-called a wire-grid polarizer described in U.S. Pat. No. 6,234,634 may be used. Obviously, this type of polarizer may be provided not only on the side of the illumination lens but also on the side of the projection lens. Further, the wire-grid polarizer may be used as the polarization separation element, which is a configuration requirement of the present invention.

The illumination condenser element (illumination lens) as an optical system for effectively illuminating the light valves (reflective liquid crystal panels, etc.) may be a condenser element, which is a combination of a fly-eye lens called the integrator and which decreases the unevenness in the illuminance applied to the light valves, or the condenser element which is combined with the condenser lens so as to guide the light effectively to the light valves. Further, a configuration combining the lens array corresponding to the PBS array pitches may be used when necessary in order to improve the uniformity of the illuminance distribution over the illuminated area. When a light source having a higher polarization degree, such as a laser light source with high output, etc. can be used, the polarization changer may not be necessary.

Further, the present invention is not limited to these embodiments, and variations and modifications may be made without departing from the scope of the present invention.

The present application is based on Japanese priority application No. 2001-401496 filed on Dec. 28, 2001 and Japanese priority application No. 2002-053661 filed on Feb. 28, 2002, the entire contents of which are hereby incorporated by reference.

What is claimed is:

1. A color separation device comprising:
    a first color separation member having a first polarization direction changing element, a second polarization direction changing element, each of said polarization direction changing element changing polarization directions of different predetermined wavebands of incident light in different modes, and a first polarization separation element that reflects or transmits the incident light according to the polarization directions of the incident light; and
    a second color separation member having a second polarization separation element, wherein,
    linearly polarized light being made first incident on said first color separation member at an angle of approximately 45 degrees so as to separate the linearly polarized light into reflected light and transmitted light, both reflected light and transmitted light having different colors and one of the different colors corresponding to one of three colors, and
    one of the reflected light and the transmitted light being made incident on said second color separation member so as to separate said one of the reflected light and the transmitted light into further reflected light and further transmitted light, both further reflected light and further transmitted light corresponding to the other two of the three colors, respectively.

2. The color separation device as claimed in claim 1, wherein said first polarization separation element is supported between said first polarization direction changing element and said second polarization direction changing element.

3. An imaging optical engine comprising:
    a color separation device claimed in claim 2;
    a first light valve, a second light valve, and a third light valve, each of said light valves receiving one of the three colors separated from the linearly polarized light by said color separation device and generating image light corresponding to said one of the three colors; and
    a color combining element combining the image lights formed with each of the three colors at said first light valve, said second light valve, and said third light valve, respectively, so that color image light can be generated.

4. The imaging optical engine as claimed in claim 3, wherein,
    said first light valve, said second light valve, and said third light valve are reflective light valves that control polarization directions,
    illumination light that passes through said first polarization direction changing element, said first polarization separation element, and said second polarization direction changing element, respectively, and that is reflected by said second polarization separation element is applied to said first light valve, image light reflected therefrom is separated from the illumination light by said second polarization separation element so as to generate image light corresponding to a first color,
    illumination light that passes through said first polarization direction changing element, said first polarization separation element, said second polarization direction changing element, and said second polarization separation element, respectively, is applied to said second light valve, image light reflected therefrom is separated from the illumination light by said second polarization element so as to generate image light corresponding to a second color, the image light corresponding to the first color and the image light corresponding to the second color are also combined by said second polarization separation element,
    illumination light that passes through said first polarization direction changing element, that is reflected by said first polarization separation element, that passes through said first polarization direction changing element again, and further passes through a third polarization separation element is applied to said third light valve, image light reflected therefrom is separated from the illumination light by said third polarization separation element so as to generate image light corresponding to a third color, and
    combined image light corresponding to both the first color and the second color is further combined with the image light corresponding to the third color so that the color image light can be generated.

5. The imaging optical engine as claimed in claim 4, wherein,
    said first polarization separation element, said second polarization separation element, said third polarization separation element, and said color combining element are arranged in a cross.

6. The imaging optical engine as claimed in claim 4, wherein,
    said first polarization separation element, said second polarization separation element, said third polarization separation element, and said color combining element are arranged on orthogonal inclined surfaces of each of four right-angle prisms, and the orthogonal inclined surfaces of each of the four right-angle prisms are arranged to face one another so that said first polarization separation element, said second polarization separation element, said third polarization separation element, and said color combining element are integrated in a block.

7. The imaging optical engine as claimed in claim 3, wherein,
a third polarization direction changing element is provided on an outgoing optical path of the color image light generated by said color combining element so as to make polarization directions of the image lights corresponding to the first color, the second color, and the third color in the color image light coincide with one another.

8. A projection apparatus comprising:
an imaging optical engine claimed in claim 3 and a projection lens, wherein,
the color image light corresponding to the three colors is generated from said imaging optical engine and said color image light is projected onto a screen by said projection lens.

9. A color separation device comprising:
a first color separation member having a first polarization direction changing element, a second polarization direction changing element, each of said polarization direction changing element changing polarization directions of different predetermined wavebands of incident light in different modes, and a first polarization separation element that reflects or transmits the incident light according to the polarization directions of the incident light; and
a second color separation member having a second polarization separation element, wherein,
linearly polarized light being made incident on said first color separation member at an angle of approximately 45 degrees so as to separate the linearly polarized light into reflected light and transmitted light, both reflected light and transmitted light having different colors and one of the different colors corresponding to one of three colors,
one of the reflected light and the transmitted light being made incident on said second color separation member so as to separate said one of the reflected light and the transmitted light into further reflected light and further transmitted light, both further reflected light and further transmitted light corresponding to the other two of the three colors, respectively,
the linearly polarized light is made incident on and passes through said first polarization direction changing element at an angle of approximately 45 degrees so as to separate the linearly polarized light into waveband light having its polarization direction changed and waveband light not having its polarization direction changed,
the waveband light having its polarization direction changed by said first polarization direction changing element is reflected from said first polarization separation element as the reflected light corresponding to one of the three colors,
the waveband light not having its polarization direction changed by said first polarization direction changing element passes through said first polarization separation element as the transmitted light,
the reflected light is separated from the transmitted light by passing through said first polarization direction changing element again, the transmitted light passes through said second polarization direction changing element that is provided in parallel with said first polarization direction changing element so as to separate the transmitted light into waveband light having its polarization direction changed and waveband light not having its polarization direction changed,
the waveband light having its polarization direction changed by said second polarization direction changing element is reflected from said second polarization separation element as further reflected light corresponding to one of the other two of the three colors, and
the waveband light not having its polarization direction changed by said second polarization direction changing element passes through said second polarization separation element as further transmitted light corresponding to the other one of the other two of the three colors.

10. A color separation device comprising:
a first color separation member having a first polarization direction changing element, a second polarization direction changing element, each of said polarization direction changing element changing polarization directions of different predetermined wavebands of incident light in different modes, and a first polarization separation element that reflects or transmits the incident light according to the polarization directions of the incident light; and
a second color separation member having a second polarization separation element, wherein,
linearly polarized light being made incident on said first color separation member at an angle of approximately 45 degrees so as to separate the linearly polarized light into reflected light and transmitted light, both reflected light and transmitted light having different colors and one of the different colors corresponding to one of three colors, and
one of the reflected light and the transmitted light being made incident on said second color separation member so as to separate said one of the reflected light and the transmitted light into further reflected light and further transmitted light, both further reflected light and further transmitted light corresponding to the other two of the three colors, respectively;
said color separation device further comprising:
a first combined optical element having said first polarization direction changing element adhesively provided on an inclined surface of a first optical prism and said first polarization separation element stacked on said first polarization direction changing element; and
a second combined optical element having said second polarization separation element adhesively provided on one of two orthogonal inclined surfaces of a second optical prism and said second polarization direction changing element adhesively provided on the other one of the two orthogonal inclined surfaces of the second optical prism; wherein,
said first combined optical element and said second combined optical element are optically integrated so that said first polarization separation element adheres to said second polarization direction changing element.

11. A color separation device comprising:
a first color separation member having a color separation function element that reflects or transmits incident light of a certain color and a polarization direction changing element that changes polarization directions of different predetermined wavebands of the incident light in different modes; and a second color separation member having a polarization separation element, wherein, linearly polarized light being made first incident on said first color separation member at an angle of approximately 45 degrees so as to separate the linearly polarized light into reflected light and transmitted light, both reflected light and transmitted light having different colors and one of the different colors corresponding to one of three colors, one of the reflected light and the transmitted light being made incident on said second color separation member so as to separate said one of the reflected light and the transmitted light into further reflected light and further transmitted light, both further reflected light and further transmitted light corresponding to the other two of the three colors, respectively, said color separation function element is provided on an inclined surface of a first optical prism, said polarization direction changing element is provided on a first inclined surface of a second optical prism, said polarization separation element is provided on a second inclined surface of the second optical prism, and said first optical prism and said second optical prism are arranged so that said color separation function element faces in parallel with said polarization direction changing element.

12. The color separation device as claimed in claim 11, wherein, said color separation function element is provided in parallel with said polarization direction changing element.

13. The color separation device as claimed in claim 11, wherein, the linearly polarized light is made incident on said color separation function element at an angle of approximately 45 degrees so as to separate the linearly polarized light into reflected light and transmitted light, both reflected light and transmitted light having different colors and one of the different colors corresponding to one of the three colors, one of the reflected light and the transmitted light passes through said polarization direction changing element so as to separate said one of the reflected light and the transmitted light into waveband light having its polarization direction changed and waveband light not having its polarization direction changed, the waveband light having its polarization direction changed by said polarization direction changing element is reflected from said polarization separation element as reflected light corresponding to one of the other two of the three colors, and the waveband light not having its polarization direction changed by said polarization direction changing element passes through said polarization direction changing element as transmitted light corresponding to the other one of the other two of the three colors.

14. An imaging optical engine comprising:

a color separation device claimed in claim 11;

a first light valve, a second light valve, and a third light valve, each of said light valves receiving one of the three colors separated from the linearly polarized light by said color separation device and generating image light corresponding to said one of the three colors; and a color combining element combining image lights formed with each of the three colors at said first light valve, said second light valve, and said third light valve, respectively, so that color image light can be generated.

15. The imaging optical engine as claimed in claim 14, wherein, said first light valve, said second light valve, and said third light valve are reflective light valves that control polarization directions, illumination light that passes through said color separation function element and said polarization direction changing element, respectively, and that is reflected by said polarization separation element is applied to said first light valve, image light reflected therefrom is separated from the illumination light by said polarization separation element so as to generate image light corresponding to a first primary light, illumination light that passes through said color separation function element, said polarization direction changing element, and said polarization separation element, respectively, is applied to said second light valve, image light reflected therefrom is separated from the illumination light by said polarization separation element so as to generate image light corresponding to a second color, the image light corresponding to the first color and the image light corresponding to the second color are also combined by said polarization separation element, illumination light that is reflected by said color separation function element and that passes though an additional polarization separation element is applied to said third light valve, image light reflected therefrom is separated from said illumination light by said additional polarization separation element so as to generate image light corresponding to a third color, and combined image light corresponding to both the first color and the second color is further combined with the image light corresponding to the third color so that the color image light can be generated.

16. The imaging optical engine as claimed in claim 15, wherein, said color separation function element and said polarization direction changing element configuring said first color separation member, said polarization separation element, said additional polarization separation element, and said color combining element are arranged in the form of a cross.

17. The imaging optical engine as claimed in claim 14, wherein, an additional polarization direction changing element is provided on an outgoing optical path of the color image light generated by said color combining element so as to make polarization directions of the image light corresponding to the first color, the second color, and the third color in the color image light coincide with one another.

18. A projection apparatus comprising:

an imaging optical engine claimed in claim 14 and a projection lens, wherein, the color image light corresponding to the three colors is generated from said imaging optical engine and said color image light is projected onto a screen by said projection lens.

19. An imaging optical engine comprising:
a color separation device comprising:
- a first color separation member having a first polarization direction changing element, a second polarization direction changing element, each of said polarization direction changing element changing polarization directions of different predetermined wavebands of incident light in different modes, and a first polarization separation element that reflects or transmits the incident light according to the polarization directions of the incident light, and
- a second color separation member having a second polarization separation element, wherein,
- linearly polarized light being made first incident on said first color separation member at an angle of approximately 45 degrees so as to separate the linearly polarized light into reflected light and transmitted light, both reflected light and transmitted light having different colors and one of the different colors corresponding to one of three colors, and
- one of the reflected light and the transmitted light being made incident on said second color separation member so as to separate said one of the reflected light and the transmitted light into further reflected light and further transmitted light, both further reflected light and further transmitted light corresponding to the other two of the three colors, respectively, wherein said first polarization separation element is supported between said first polarization direction changing element and said second polarization direction changing element;

a first light valve, a second light valve, and a third light valve, each of said light valves receiving one of the three colors separated from the linearly polarized light by said color separation device and generating image light corresponding to said one of the three colors;

a color combining element combining the image lights formed with each of the three colors at said first light valve, said second light valve, and said third light valve, respectively, so that color image light can be generated; and a polarizer is detachably provided at the end of an outgoing optical path of the color image light generated by said color combining element.

20. An imaging optical engine comprising:
a color separation device comprising:
- a first color separation member having a color separation function element that reflects or transmits incident light of a certain color and a polarization direction changing element that changes polarization directions of different predetermined wavebands of the incident light in different modes, and
- a second color separation member having a polarization separation element, wherein,
- linearly polarized light being made first incident on said first color separation member at an angle of approximately 45 degrees so as to separate the linearly polarized light into reflected light and transmitted light, both reflected light and transmitted light having different colors and one of the different colors corresponding to one of three colors, and
- one of the reflected light and the transmitted light being made incident on said second color separation member so as to separate said one of the reflected light and the transmitted light into further reflected light and further transmitted light, both further reflected light and further transmitted light corresponding to the other two of the three colors, respectively;

a first light valve, a second light valve, and a third light valve, each of said light valves receiving one of the three colors separated from the linearly polarized light by said color separation device and generating image light corresponding to said one of the three colors;

a color combining element combining the image lights formed with each of the three colors at said first light valve, said second light valve, and said third light valve, respectively, so that color image light can be generated, wherein said first light valve, said second light valve, and said third light valve are reflective light valves that control polarization directions, illumination light that passes through said color separation function element and polarization direction changing element, respectively, and that is reflected by said polarization separation element is applied to said first light valve, image light reflected therefrom is separated from the illumination light by said polarization separation element so as to generate image light corresponding to a first primary light, illumination light that passes through said color separation function element, said polarization direction changing element, and said polarization separation element, respectively, is applied to said second light valve, image light reflected therefrom is separated from the illumination light by said polarization element so as to generate image light corresponding to a second color, the image light corresponding to the first color and the image light corresponding to the second color are also combined by said polarization separation element, illumination light that is reflected by said color separation function element and that passes through an additional polarization separation element is applied to said third light valve, image light reflected therefrom is separated from said illumination light by said additional polarization separation element so as to generate image light corresponding to a third color, combined image light corresponding to both the first color and the second color is further combined with the image light corresponding to the third color so that the color image light can be generated, said color separation function element and said polarization direction changing element configuring said first color separation member, said polarization separation element, said additional polarization separation element, and said color combining element are arranged on orthogonal inclined surfaces of each of four right-angle prisms, and said color separation function element and said polarization direction changing element configuring said first color separation member, said polarization separation element, said additional polarization separation element, and said color combining element are integrated in the form of a block.

21. An imaging optical engine comprising:
a color separation device comprising:
- a first color separation member having a color separation function element that reflects or transmits incident light of a certain color and a polarization direction changing element that changes polarization directions of different predetermined wavebands of the incident light in different modes, and a second color separation member having a polarization separation element, wherein, linearly polarized light being made first incident on said first color separation member at an angle of approximately 45 degrees so as to separate the linearly polarized light into reflected light and transmitted light, both reflected light and transmitted light having different colors and one of the different colors corresponding to one of three colors, and one of the reflected light and the transmitted light being made incident on said second color separation member so as to separate said one of the reflected light and the transmitted light into further reflected light and further transmitted light, both further reflected light and further transmitted light corresponding to the other two of the three colors, respectively;

a first light valve, a second light valve, and a third light valve, each of said light valves receiving one of the three colors separated from the linearly polarized light by said color separation device and generating image light corresponding to said one of the three colors;

a color combining element combining the image lights formed with each of the three colors at said first light valve, said second light valve, and said third light valve, respectively, so that color image light can be generated; and a polarizer detachably provided at the end of an outgoing optical path of the color image light generated by said color combining element.

22. A color separation member comprising:

a first polarization direction changing element;

a second polarization direction changing element, each of said polarization direction changing elements changing polarization directions of different predetermined wavebands of incident light; and a polarization separation element that reflects or transmits the incident light according to polarization directions of the incident light, wherein, said polarization separation element is supported between said first polarization direction changing element and said second polarization direction changing element, and linearly polarized light being made first incident on said color separation member at an angle of approximately 45 degrees so as to separate the linearly polarized light into reflected light and transmitted light, both reflected light and transmitted light having different colors and one of the different colors corresponding to one of three colors.

23. The color separation member as claimed in claim 22, wherein said first polarization direction changing element and said second polarization direction changing elements are wavelength selective retarders.

24. A color separation member comprising:

a color separation function element which reflects or transmits incident light of a certain color; and a polarization direction changing element that changes polarization directions of different predetermined wavebands of the incident light, wherein, said color separation function element is provided in parallel with said polarization direction changing element, linearly polarized light being made first incident on said color separation member at an angle of approximately 45 degrees so as to separate the linearly polarized light into reflected light and transmitted light, both reflected light and transmitted light having different colors and one of the different colors corresponding to one of three colors, said color separation function element is provided on an inclined surface of a first optical prism, said polarization direction changing element is provided on a first inclined surface of a second optical prism, a polarization separation element is provided on a second inclined surface of the second optical prism, and said first optical prism and said second optical prism are arranged so that said color separation function element faces in parallel with said polarization direction changing element.

25. The color separation member as claimed in claim 24, wherein said polarization direction changing element is a wavelength selective retarder.

* * * * *